(12) United States Patent
Gifford et al.

(10) Patent No.: US 10,908,047 B2
(45) Date of Patent: Feb. 2, 2021

(54) REGISTERING MEASURED OPTICAL FIBER INTERFEROMETRIC DATA WITH REFERENCE OPTICAL FIBER INTERFEROMETRIC DATA

(71) Applicant: Intuitive Surgical Operations, Inc., Sunnyvale, CA (US)

(72) Inventors: Dawn K. Gifford, Blacksburg, VA (US); Mark E. Froggatt, Blacksburg, VA (US); Patrick Roye, Christiansburg, VA (US); Jeffrey T. LaCroix, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 0 days.

(21) Appl. No.: 16/900,643

(22) Filed: Jun. 12, 2020

(65) Prior Publication Data

US 2020/0378866 A1 Dec. 3, 2020

Related U.S. Application Data

(63) Continuation of application No. 15/528,911, filed as application No. PCT/US2016/025491 on Apr. 1, 2016, now Pat. No. 10,732,075.

(Continued)

(51) Int. Cl.
*G01M 11/00* (2006.01)
*G01D 5/353* (2006.01)
(Continued)

(52) U.S. Cl.
CPC ..... *G01M 11/3172* (2013.01); *G01D 5/35316* (2013.01); *G01K 11/3206* (2013.01); *G01L 1/246* (2013.01)

(58) Field of Classification Search
USPC .......................................................... 702/90
See application file for complete search history.

(56) References Cited

U.S. PATENT DOCUMENTS

| | | | |
|---|---|---|---|
| 5,798,521 | A | 8/1998 | Froggatt |
| 6,566,648 | B1 | 5/2003 | Froggatt |
| | | (Continued) | |

FOREIGN PATENT DOCUMENTS

| | | |
|---|---|---|
| CN | 101915595 A | 12/2010 |
| CN | 102636196 A | 8/2012 |
| | (Continued) | |

OTHER PUBLICATIONS

International Preliminary Report on Patentability for Application No, PCT/US2016/025491, dated Oct. 12, 2017, 17 pages.

(Continued)

*Primary Examiner* — Paul D Lee
(74) *Attorney, Agent, or Firm* — Schwegman Lundberg & Woessner, P.A.

(57) ABSTRACT

A system and method are used for an optical fiber having a core multiple, closely-spaced optical gratings written along the core that create a repeated pattern in the core. A memory stores predetermined reference reflection data and measurement reflection data determined for a length of the core detected from interferometric patterns corresponding to scatter reflections received from the core. Data processing circuitry reduces or removes from the measurement reflection data information that corresponds to reflections due to the repeated pattern in the core to produce filtered measurement data. One or more portions of the filtered measurement data is/are correlated with one or more portions of the reference reflection data to produce multiple correlation values. The greatest of the multiple correlation values is (Continued)

determined, and a location along the fiber corresponding to the greatest correlation value is identified.

20 Claims, 21 Drawing Sheets

Related U.S. Application Data

(60) Provisional application No. 62/142,062, filed on Apr. 2, 2015.

(51) Int. Cl.
  *G01K 11/32* (2006.01)
  *G01L 1/24* (2006.01)

(56) References Cited

U.S. PATENT DOCUMENTS

| | | | |
|---|---|---|---|
| 7,440,087 | B2 | 10/2008 | Froggatt et al. |
| 8,131,121 | B2 | 3/2012 | Huffman |
| 8,400,620 | B2 * | 3/2013 | Froggatt ............ G01B 11/161 356/35.5 |
| 2009/0046276 | A1 | 2/2009 | Moore |
| 2011/0317148 | A1 | 12/2011 | Froggatt et al. |
| 2014/0320846 | A1 | 10/2014 | Froggatt et al. |
| 2015/0029511 | A1 * | 1/2015 | 'T Hooft ............ G01B 11/24 356/477 |
| 2017/0276523 | A1 * | 9/2017 | Lally ............ G01M 11/00 |
| 2017/0322113 | A1 | 11/2017 | Gifford et al. |

FOREIGN PATENT DOCUMENTS

| | | |
|---|---|---|
| CN | 103674079 A | 3/2014 |
| CN | 203704951 U | 7/2014 |
| CN | 104169678 A | 11/2014 |
| CN | 102519501 B | 12/2014 |
| JP | H10267945 A | 10/1998 |
| JP | 3740500 B2 | 2/2006 |
| JP | 5232982 B2 | 7/2013 |
| KR | 20140030800 A | 3/2014 |
| WO | WO-2014200986 A1 | 12/2014 |
| WO | WO-2014204839 A1 | 12/2014 |

OTHER PUBLICATIONS

"International Search Report and Written Opinion for Application No. PCT/US2016/025491, dated Jul. 11, 2016, 21 pages."
Extended European Search Report for Application No. EP16774284 dated Oct. 12, 2018, 19 pages.
Vertut, Jean and Phillipe Coiffet, Robot Technology: Teleoperation and Robotics Evolution and Development, English translation, Prentice-Hall, Inc., Inglewood Miffs, NJ, USA 1986, vol. 3A, 332 pages.

* cited by examiner

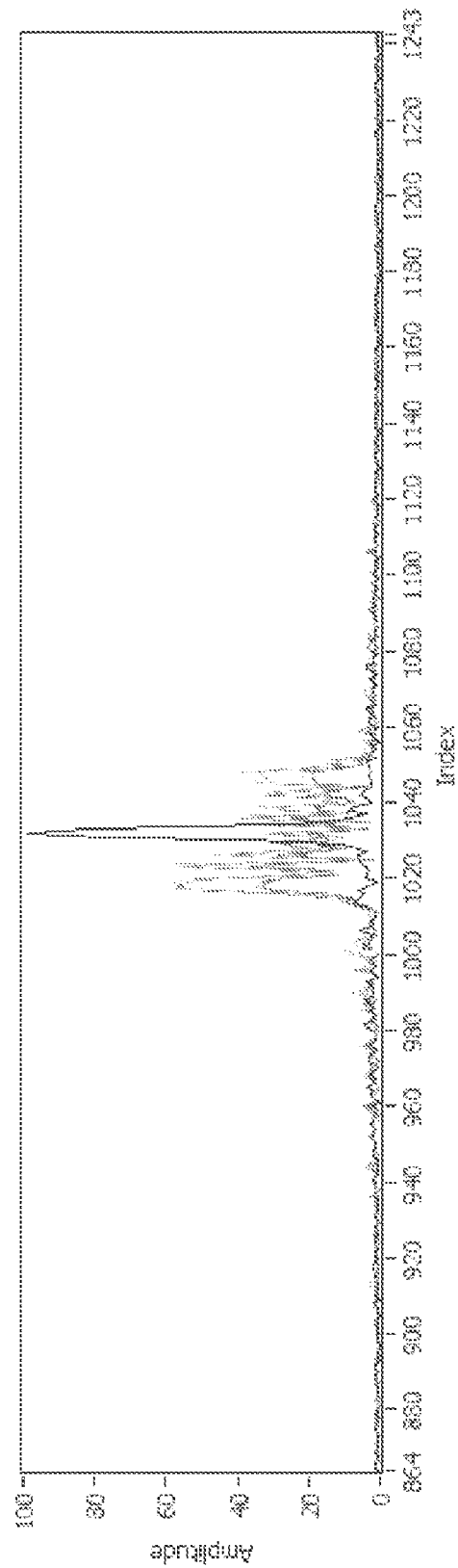

REGISTERING MEASURED OPTICAL FIBER INTERFEROMETRIC DATA WITH REFERENCE OPTICAL FIBER INTERFEROMETRIC DATA

RELATED APPLICATIONS

This patent application is a continuation of and claims the benefit of priority under 35 U.S.C. § 120 to U.S. patent application Ser. No. 15/528,911, filed on May 23, 2017, which is a U.S. National Stage Filing under 35 U.S.C. 371 from International Application No. PCT/US2016/0025491, filed on Apr. 1, 2016, and published as WO 2016/161245 A1 on Oct. 6, 2016, which claims the benefit of priority under 35 U.S.C. § 119(e) to U.S. Provisional Patent Application No. 62/142,062, filed on Apr. 2, 2015, each of which is incorporated by reference herein in its entirety.

TECHNICAL FIELD

The technology relates to optical fiber sensing.

INTRODUCTION

Optical strain sensing is a technology useful for measuring physical deformation of a waveguide caused by, for example, the change in tension, compression, or temperature of an optical fiber. This can be done with a standard, single core optical fiber or with a multi-core optical fiber. A multi-core optical fiber includes multiple independent waveguides or cores embedded within a single fiber. A continuous measure of strain along the length of a core can be derived by interpreting the optical response of the core using swept wavelength inteferometry. With knowledge of the relative positions of the cores along the length of the fiber, these independent strain signals for each of the cores may be combined to gain a measure of the strain profile applied to the multi-core optical fiber. The strain profile of the fiber refers to the measure of applied bend strain, twist strain, and/or axial strain along the length of the fiber at a high (e.g., less than 50 micrometers) sample resolution. In a technique known as optical position and/or shape sensing, detailed for example in commonly-assigned U.S. Pat. No. 8,773,650 to Froggatt et al, which is incorporated herein by reference, this strain profile information can be used to reconstruct the three dimensional position of the fiber.

For best practice in shape sensing, currently-obtained measurement data from each core should be accurately aligned or registered with previously-obtained reference measurement data for that core. Shape sensing fibers may contain fiber Bragg gratings written semi-continuously along each core. These gratings form a repeated pattern along the length of the fiber. This repetition poses a challenge in registering the data in that one location on the fiber can look much like (have the same or similar pattern as) another location on the fiber. In fact, if a simple spatial cross correlation is performed between the current measurement data and the reference data, there is generally a strong correlation with correlation peaks at multiples of the Bragg grating width where Bragg gratings overlap.

FIG. 1 is a graph showing an example cross correlation amplitude vs. distance of measurement vs. reference data for fiber core with semi-continuous Bragg gratings. The correlation is generally strong and peaks when whole gratings overlap, which is every 20 or so mm in this example.

SUMMARY

What is needed is technology that accurately identifies specific locations along a fiber that includes multiple optical gratings which can be accurately matched to the corresponding reference data for those same locations.

Example embodiments relate to a data processing system for registering an optical fiber having a core including multiple, closely-spaced optical gratings written along the core that create a repeated pattern in the core includes a memory configured to store predetermined reference reflection data and measurement reflection data determined for a length of the core detected from interferometric patterns corresponding to scatter reflections received from the core. Data processing circuitry, coupled to the memory, is configured to reduce or remove from the measurement reflection data information that corresponds to reflections due to the repeated pattern in the core to produce filtered measurement data, correlate one or more portions of the filtered measurement data with one or more portions of the reference reflection data to produce multiple correlation values, determine which of the multiple correlation values is the greatest, and identify a location along the core corresponding to the greatest correlation value.

For example, the data processing circuitry may reduce or remove from the reference reflection data information that corresponds to reflections due to the repeated signal in the multiple gratings to produce filtered reference data, and correlate a set of selected segments of the filtered measurement data with a selected segment of the filtered reference reflection data to produce the multiple correlation values or correlate a selected segment of the filtered measurement data with a set of selected segments of the filtered reference reflection data to produce the multiple correlation values.

Examples of filtered measurement data may include Rayleigh scatter data detected for core segments between adjacent optical gratings and reflection data detected for core segments corresponding to overlapping optical gratings. Reflections from the optical gratings have a center wavelength, and in one example implementation, the data processing circuitry reduces or removes from the measurement reflection data information for a spectral peak that corresponds to the center wavelength to produce the filtered measurement data.

If the optical fiber include multiple helixed cores with each of the cores including multiple closely-spaced optical gratings written along each core, then the data processing circuitry compresses reflected grating spectra corresponding to outer ones of the helixed cores back to the center wavelength.

In non-limiting example implementations, the data processing circuitry may reduce a size of the reference reflection data to a size of the measurement reflection data. The data processing circuitry may also incrementally change the selected segment of the filtered measurement data by an index increment having a first resolution within a search range. Another option is for the data processing circuitry to interpolate between adjacent indices to achieve finer resolution. Such optional interpolation may for example be done by zero padding the reflection data in the spectral domain. Another option is for the data processing circuitry to incrementally change the selected segment of the filtered measurement data by an index increment having a second resolution finer than the first resolution based on the interpolation.

Another non-limiting example implementation feature is for the data processing circuitry to determine a parabolic fit of multiple correlation values and to determine the location along the core corresponding to the greatest correlation value using the parabolic fit. The data processing circuitry can also optionally interpolate between adjacent indices to achieve finer resolution by zero padding the reflection data in the spectral domain, determine a parabolic fit of multiple correlation values, and determine the location along the core corresponding to the greatest correlation value using interpolated indices and the parabolic fit.

Other non-limiting example implementation features include averaging multiple sets of measurement reflection data to determine the measurement reflection data and/or normalizing the measurement reflection data and the reference reflection data.

In non-limiting example implementations, if none of the correlation values exceeds a threshold, the data processing circuitry determines that the optical fiber connected for the measurement does not match the reference reflection data. Alternatively, the data processing circuitry is configured to identify the optical fiber from multiple other different optical fibers based on the multiple correlation values. Yet another alternative is the data processing circuitry is configured to identify whether an optical fiber is connected to the interferometric measurement system based on the multiple correlation values.

In non-limiting example implementations, the data processing circuitry is included in an interferometric measurement system. The data processing circuitry is further configured to detect an undesirable connection of an optical fiber to the interferometric measurement system based on a comparison of a reflected signal level detected for the optical fiber to a noise floor.

Example embodiments relate to a method for registering an optical fiber having a core including multiple, closely-spaced optical gratings written along the core that create a repeated pattern in the core. The method includes generating and detecting interferometric patterns corresponding to scatter reflections received from the core; determining measurement reflection data from the interferometric patterns; reducing or removing from the measurement reflection data information that corresponds to reflections due to the repeated pattern in the core to produce filtered measurement data; correlating one or more portions of the filtered measurement data with one or more portions of predetermined reference reflection data to produce multiple correlation values; determining which of the multiple correlation values is the greatest; and identifying a location along the core corresponding to the greatest correlation value.

Example embodiments relate to other apparatus and methods as described herein.

BRIEF DESCRIPTION OF THE DRAWINGS

FIG. 22A is a plot showing example measurement spectra for four polarization states (lighter shaded lines) compared with the reference data spectrum (black lines) when the measurement data has not been corrected with a phase estimate.

DETAILED DESCRIPTION

Figure 1:
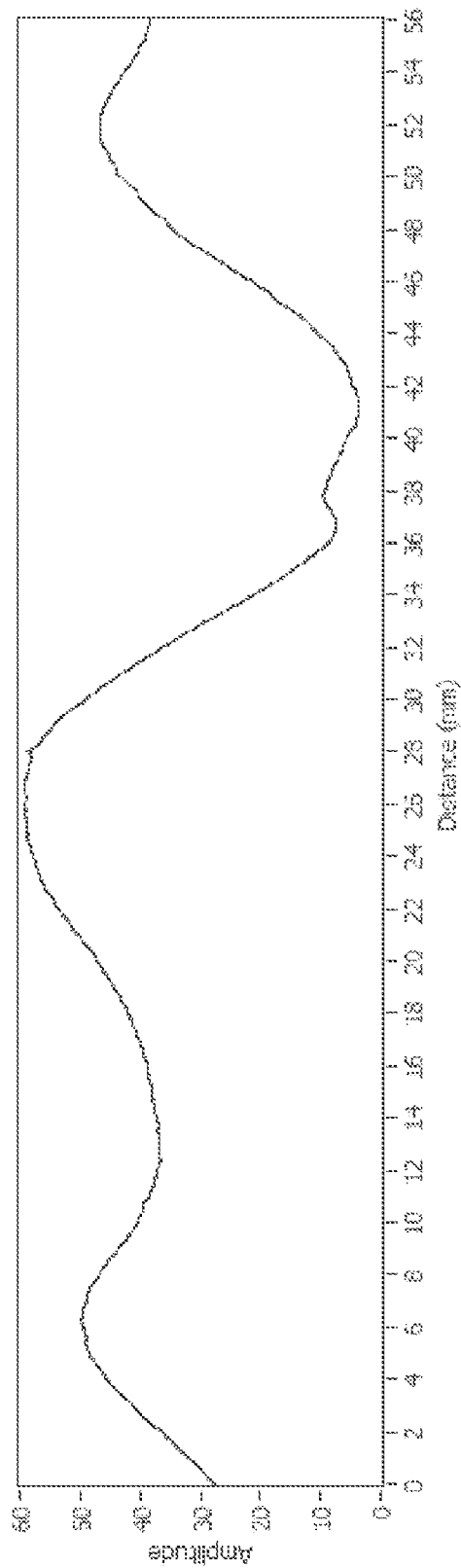
FIG. 1 is a graph showing an example cross correlation amplitude vs. distance of measurement vs. reference data for fiber core with semi-continuous Bragg gratings.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not to obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of structures and functional units. It will be appreciated that a flow chart represents processes which may be substantially represented in computer-readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, functional data processing blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 2:
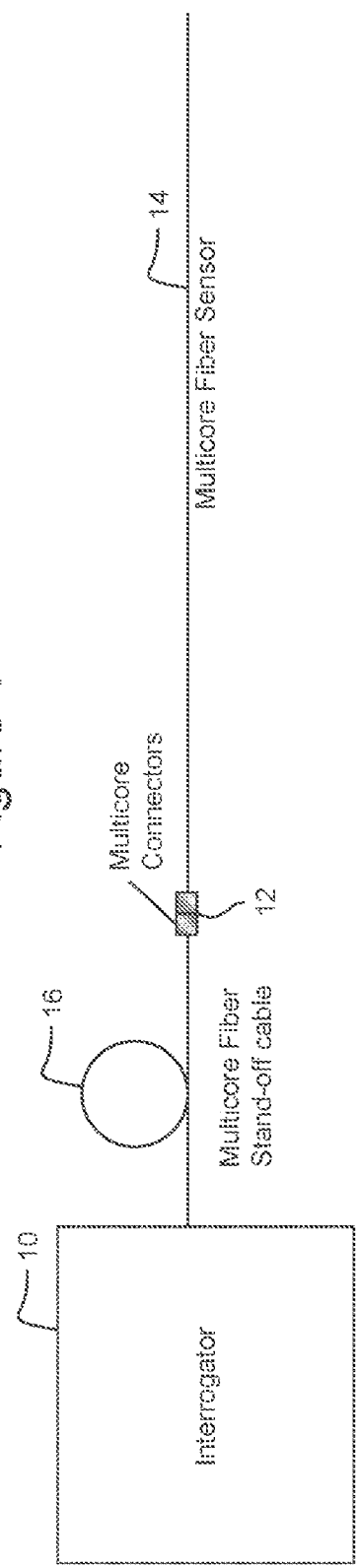
FIG. 2 shows an example of a multicore fiber sensor connected to an optical interrogation system by a multicore connector.

FIG. 2 shows an example multicore fiber sensor 14 that includes optical gratings along the cores in the fiber 14, connected to an optical interrogation system 10 (also called "interrogator 10") by a multicore connector 12. A multicore standoff cable 16 in this example separates the fiber 14 and the interrogator 10. It should be noted that the technology described below is suitable for registering single core fiber (that includes optical gratings along the core) as well, but multicore fiber with optical gratings along the cores (which is used for shape sensing) is described in the example embodiments below. In one example application, multicore optical fiber can be used to sense the shape of robotic medical instruments.

Figure 3:
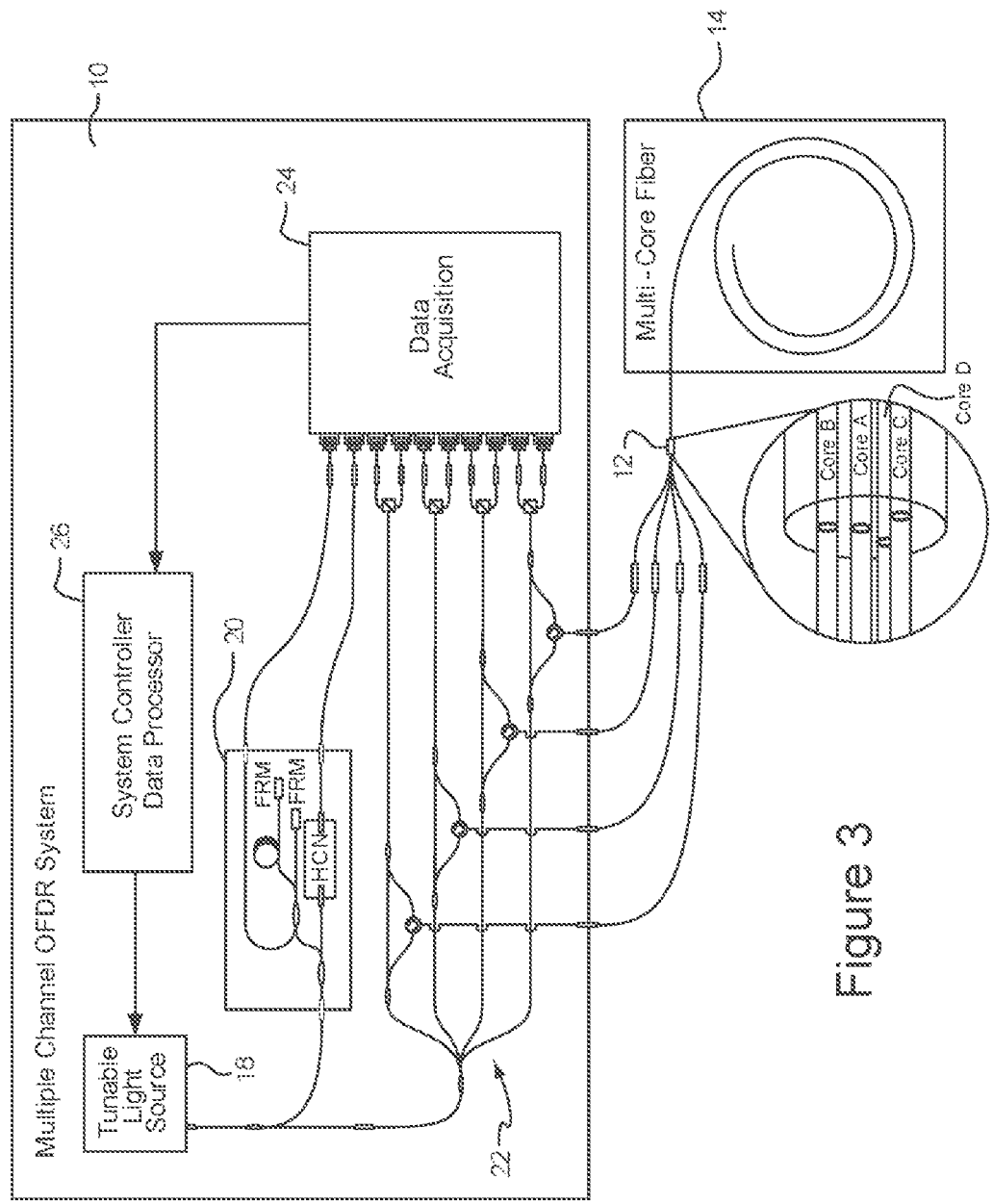
FIG. 3 shows a non-limiting example embodiment using an OFDR-based, multi-core fiber sensing system.

One example of an optical interferometric interrogation system is an Optical Frequency Domain Reflectometry (OFDR) system. FIG. 3 shows a non-limiting example embodiment using an Optical Frequency Domain Reflectometry (OFDR)-based, multi-core fiber sensing system including an OFDR interrogation system 10 coupled to a multi-core optical fiber 14. The multi-core optical fiber 14 includes four cores A-D in this example and is connected via connector 12 to an OFDR interrogation system 10. Each of the cores includes optical gratings inscribed along the core. A continuous measure of strain along the length of each optical core in the fiber can be derived by interpreting the optical response of the core using swept wavelength inteferometry. Optical time domain measurements with high resolution and high sensitivity may be achieved using OFDR. A multiple channel OFDR system (one channel is used to interrogate each optical fiber core) includes a tunable light source 18, an interferometric interrogator 22, a laser monitor network 20, data acquisition electronic circuitry of the data acquisition unit 24, and a system controller data processor 26.

Figure 4:
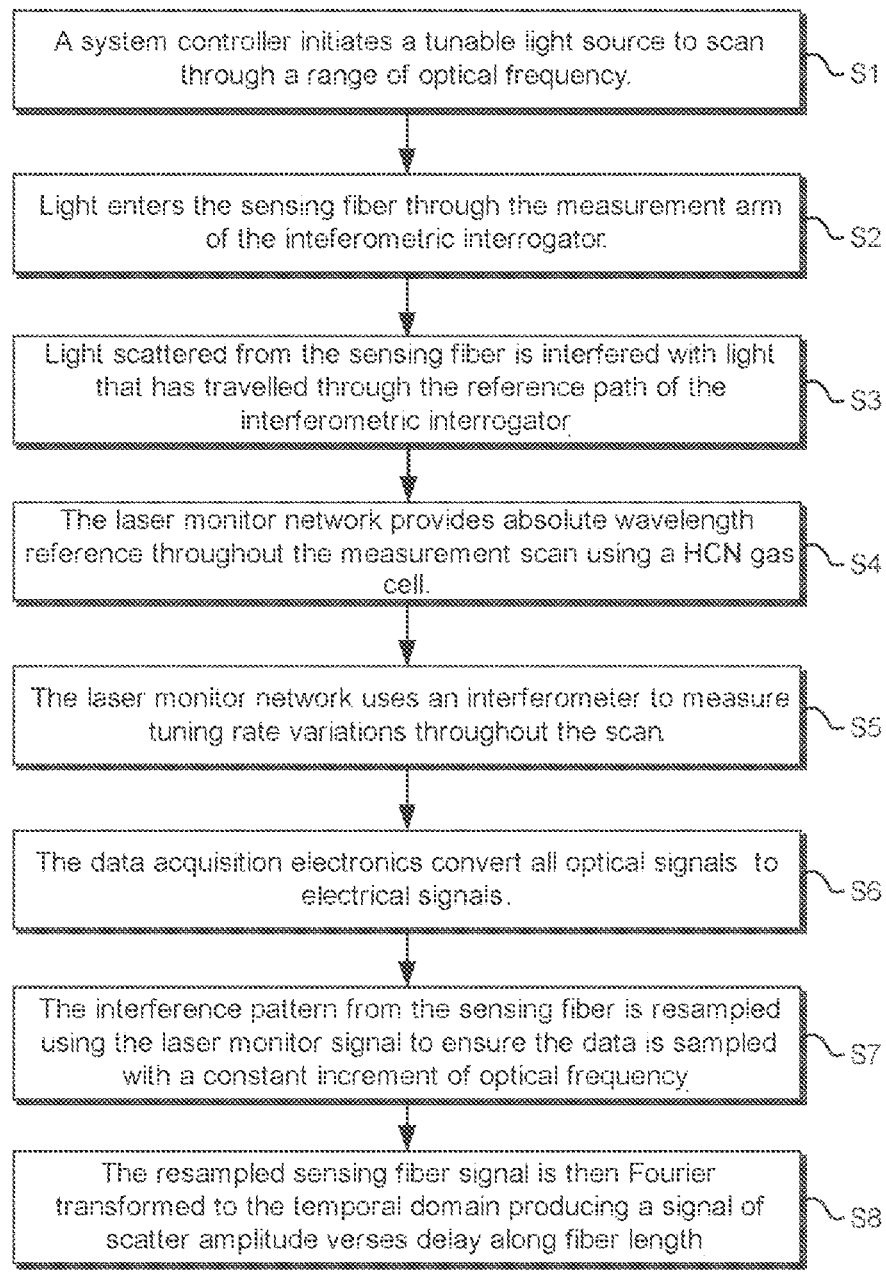
FIG. 4 is a flowchart illustrating example procedures for OFDR measurements using the example system in FIG. 3.

FIG. 4 is a flowchart illustrating example procedures for OFDR measurements using the example system in FIG. 3. The steps describe the operation for one core which means that for a multi-core fiber, these steps are applied to each of the cores.

During an OFDR measurement, a tunable light source 18 is swept through a range of optical frequencies (step S). This light is split with the use of optical couplers and routed to multiple interferometers. One set of interferometers are interferometric interrogators 22 which are connected via a connector 12 to a length of sensing fiber 14. Light enters the multicore sensing fiber 14 through the measurement arms of interferometric interrogators 22 (step S2). Scattered light from the sensing fiber 14, including reflected light from the gratings inscribed on the core, is then interfered with light that has traveled along the reference arm of the interferometric interrogators 22 (step S3). The laser monitor network 20 contains a Hydrogen Cyanide (HCN) gas cell that provides an absolute wavelength reference throughout the measurement scan (step S4). Another interferometer, within the laser monitor network 20, is used to measure fluctuations in tuning rate as the light source 18 is scanned through a frequency range (step S5). A series of optical detectors (e.g., photodiodes) at input terminals of the data acquisition unit 24 convert the light signals from the laser monitor network, gas cell, and the interference patterns from the sensing fiber to corresponding electrical signals (step S6). A data processor in a data acquisition unit 24 uses the information from the laser monitor network's 20's interferometer to resample the detected interference patterns of the sensing fiber 14 so that the patterns possess increments constant in optical frequency (step S7). This step is a mathematical requisite of the Fourier transform operation. Once resampled, a Fourier transform is performed by the system controller 26 to produce a light scatter signal in the temporal domain for an initial orientation of the multi-core fiber 14 (step S8). In the temporal domain, the amplitudes of the light scattering events (e.g., caused by fiber Bragg gratings along the cores of the fiber) are depicted verses delay along the length of the fiber. Using the distance that light travels in a given increment of time, this delay can be converted to a measure of length along the sensing fiber. In other words, the light scatter signal indicates each scattering event (e.g., caused by fiber Bragg gratings along the cores of the fiber) as a function of distance along the fiber. The sampling period is referred to as the spatial resolution and is inversely proportional to the frequency range that the tunable light source 18 was swept through during the measurement.

As the fiber is strained, the local light scatters shift as the fiber changes in physical length. The reflections from local light scatters are highly repeatable. Hence, an OFDR measurement of detected light scatter for the fiber can be retained in memory that serves as a reference pattern of the fiber in an unstrained state. A subsequently measured scatter signal when the fiber is under strain may then be compared to this reference pattern by the system controller 26 to gain a measure of shift in delay of the local scatters along the length of the sensing fiber. This shift in delay manifests as a continuous, slowly varying optical phase signal when compared against the reference scatter pattern. The derivative of this optical phase signal is directly proportional to change in physical length of the sensing core. Change in physical length may be scaled to strain producing a continuous measurement of strain along the sensing fiber.

When comparing a subsequently measured scatter signal, e.g., when the fiber is under strain, to a reference pattern, it is necessary to accurately align currently-obtained measurement data from each core to previously-obtained reference measurement data for that core. As explained in the introduction, fiber Bragg gratings written semi-continuously along each core form a repeated pattern along the length of the fiber that makes it difficult to register the measurement data for one location to the corresponding reference data for that same location. As shown in FIG. 1 described above, a simple spatial cross correlation performed between the current measurement data and the reference data generally produces correlation peaks at multiples of the Bragg grating width.

Figure 5:
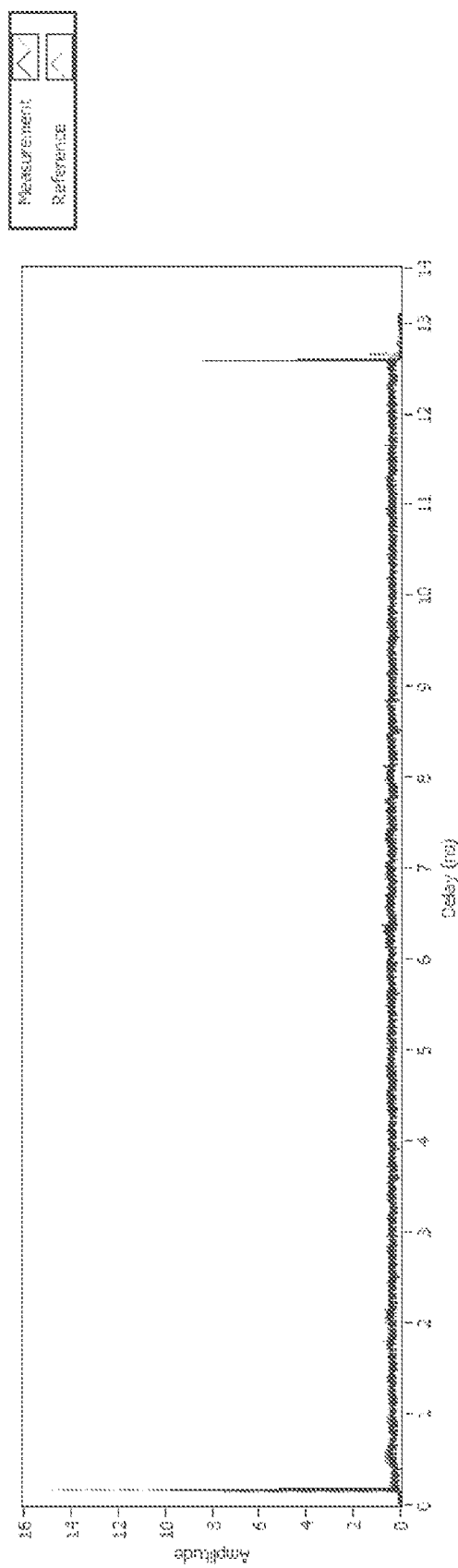
FIG. 5 shows an example OFDR trace of reflection vs. delay data.

One approach to register a set of measurement OFDR data for a fiber to reference OFDR data is to use the reflection from the connector 12. As shown in an example OFDR trace in FIG. 5, a connector appears as a relatively strong, sharp peak between 0 and 1 ns in the reflection vs. delay data in the graph. This peak can be identified and lined up with the same peak in the reference data to align the two data sets. A first problem with this approach is that if the connection is very good, this peak may well be weak or undetectable. A second problem is that the location at which a user may wish to begin sensing may be a significant distance beyond the connector. If the fiber is in tension or compression between the connector location and the start of the sensing region, the alignment of the connector location may no longer properly align the location at which sensing processing begins. A third problem with using the connector approach is that it does not allow unique identification of a particular fiber sensor or an indication if a fiber sensor is even connected.

To uniquely identify a location in a fiber core with semi-continuous gratings written in it, (i.e., a fiber having individual gratings spaced such that they overlap or have gaps between them which disturb the periodicity of the grating pattern), with respect to its location in a reference measurement, the inventors recognized that that each fiber, whether inscribed with gratings or not, naturally contains a unique Rayleigh backscatter reflection signal pattern caused by microscopic particles in the core glass material that can be used to uniquely identify specific regions and locations along that fiber. These Rayleigh backscatter reflection signals, although having weaker reflection amplitudes than the grating reflection signals, are random rather than periodic. There are also often "gaps" between repeated Bragg gratings that can include such random signals.

Figure 6:
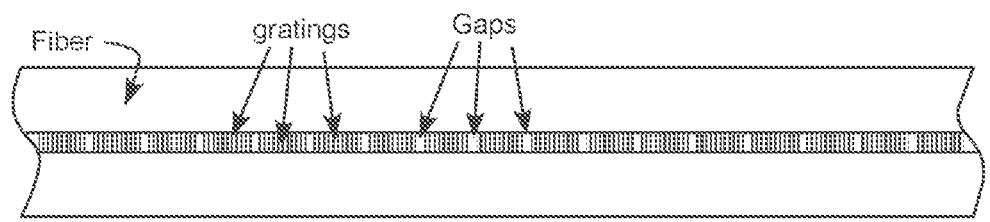
FIG. 6 shows a fiber core containing semi-continuous fiber Bragg gratings separated by gaps.

FIG. 6 shows a fiber core containing semi-continuous fiber Bragg gratings which are separated by small gaps from a random scattering reflection signal is produced in an OFDR measurement, i.e., Rayleigh backscatter. Each fiber Bragg grating has the same pattern so the multiple gratings results in a repeated pattern along the core.

Figure 7:
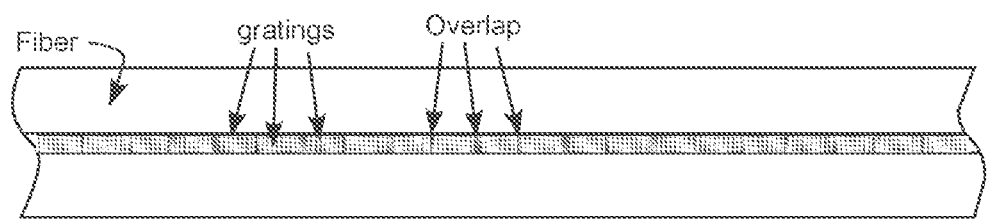
FIG. 7 illustrates a fiber core containing semi-continuous fiber Bragg gratings that overlap slightly at the edges.

FIG. 7 illustrates a fiber core containing semi-continuous fiber Bragg gratings that overlap slightly at the edges creating a random scattering signal in the overlap region produced in an OFDR measurement. The overlapping gratings are not generally aligned in phase. The mismatch in phase alignment between the periodic patterns of the overlapped gratings causes a random phase and amplitude signal in the overlap region where the gratings interfere with each other, which breaks up the repeated pattern.

Figure 8:
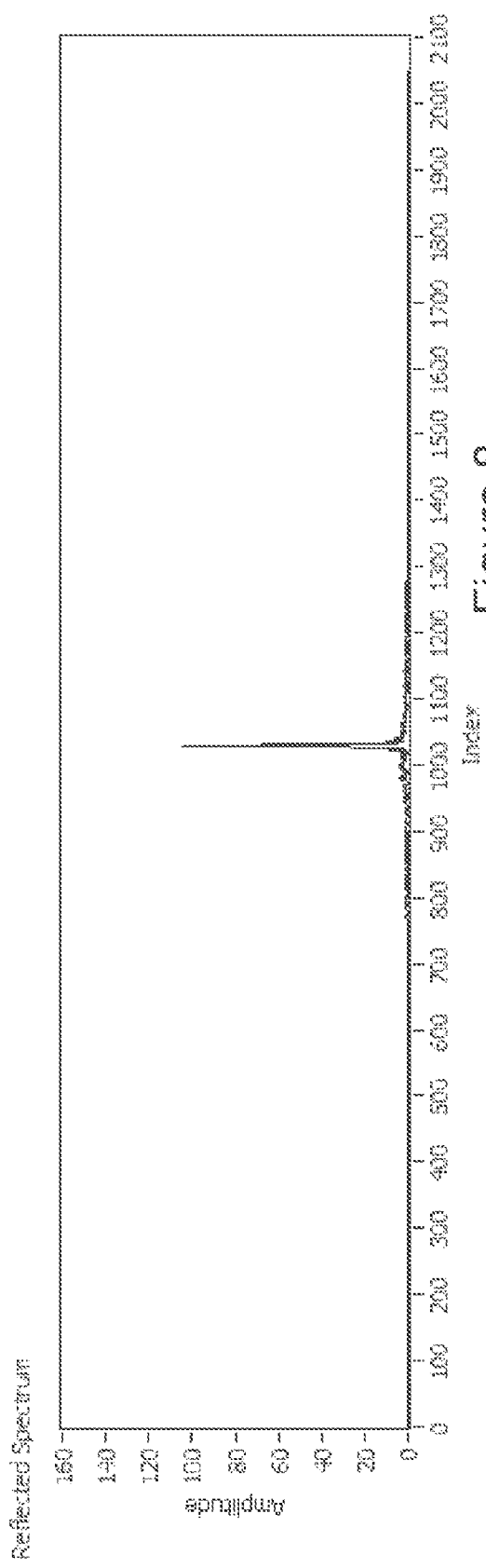
FIG. 8 shows an example of the reflected spectrum from a section of a single core of an unbent fiber.

Because these random scatter reflections are relatively weak, it is advantageous to eliminate or reduce the effect of the stronger, periodic grating reflections. The optical gratings are primarily written on each core at one center wavelength corresponding to the repeated pattern. If the fiber is unbent, then the reflected spectrum from a section of a single core of the fiber has a strong central peak at the gratings' center wavelength. FIG. 8 shows an example of such a spectrum with a center wavelength located between the indexes of 1000 and 1100.

Figure 9:
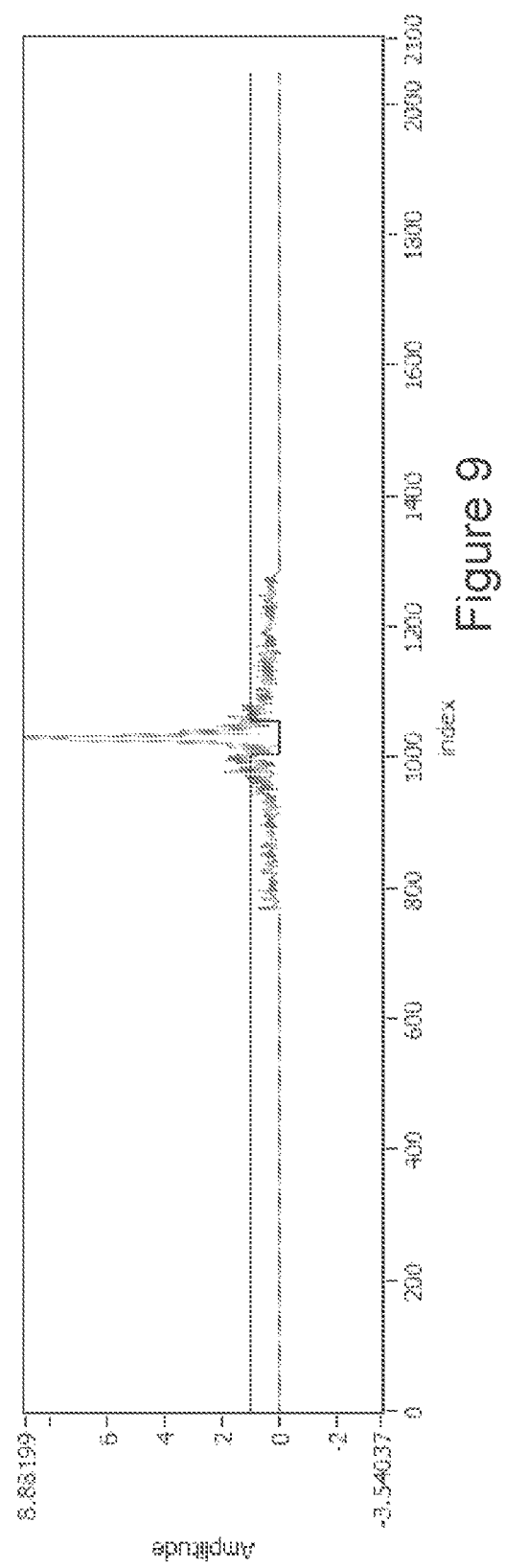
FIG. 9 shows an example of a window applied to the reflected spectrum from the fiber core.

This central spectral peak corresponding to the repeated pattern of grating along the core is filtered or windowed out of the OFDR measurement data. The remaining broadband signal is the reflected spectrum from random elements in the fiber core, e.g., Rayleigh scatter, overlapping optical gratings, etc. FIG. 9 shows an example of a window applied to the reflected spectrum. The window is shown as an inverted step function, the original spectrum includes the peak inside the window, and the windowed spectrum is shown on either side of the window. The window may be implemented using digital or analog filtering, e.g., using a band-stop filter, band-rejection filter, notch filter, etc.

Figure 10:
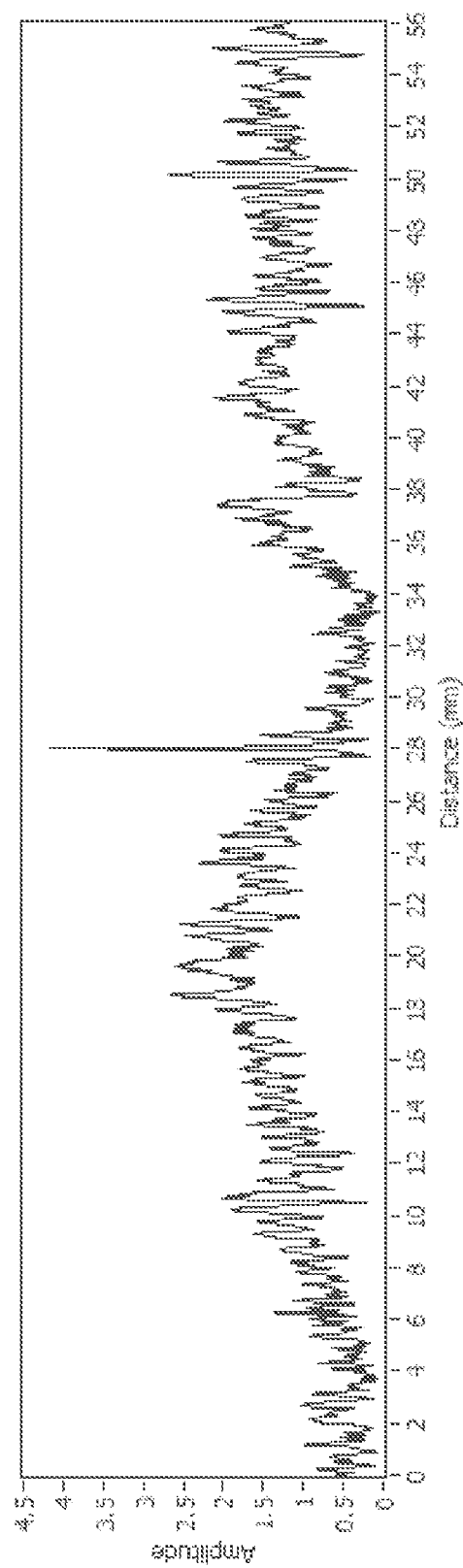
FIG. 10 shows an example plot of cross correlation amplitude vs. distance for a fiber core with semi-continuous gratings with the grating reflection filtered or windowed out in the spectral domain.

Once the spectra from both the fiber's OFDR measurement and the reference OFDR reflection data are filtered (windowed), a spectral amplitude cross-correlation is performed between the two filtered data sets to identify the correct location in the measurement data. FIG. 10 shows a plot of an example cross correlation amplitude vs. distance for a fiber core with semi-continuous gratings with the grating reflections windowed out in the spectral domain. The result is a unique, strong correlation peak clearly identifying the location where the measurement data matches the reference data shown at about 28 mm.

Figure 11A:
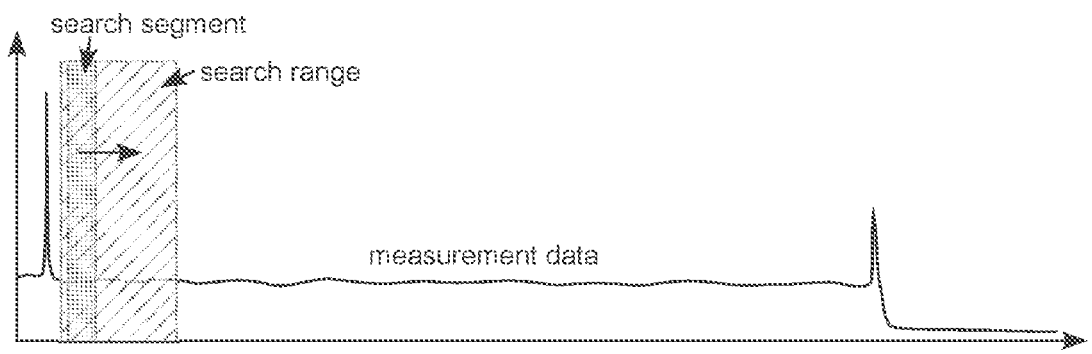
FIGS. 11A and 11B are example graphs of amplitude v. spatial index in the spectral domain that illustrate a segment searching procedure.
Figure 11B:
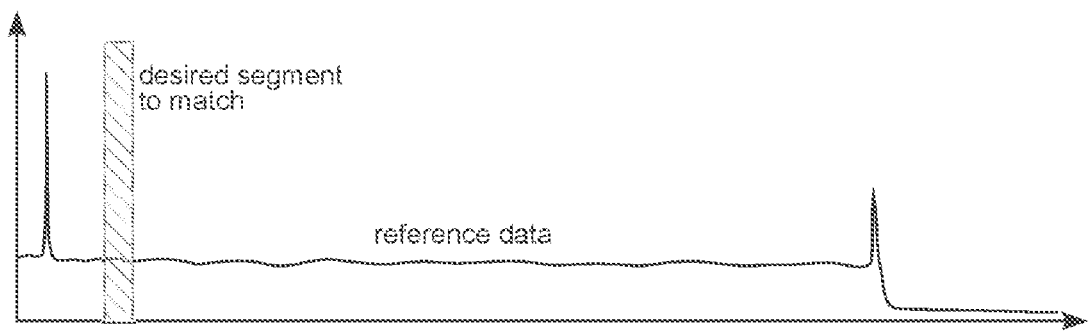

The following example procedure may be used to identify this correlation peak. FIGS. 11A and 11B are example graphs of amplitude v. spatial index in the temporal domain that illustrate a segment searching procedure. A desired fiber segment at a particular location along the fiber is selected (shown as the "desired segment to match" in FIG. 11B) and spatially windowed in the reference data. If the reference data is larger than the measurement data, e.g., it may be twice the size of the measurement data spectrally, then the reference data is preferably reduced to the same size of the measurement data in the spectral domain. A segment of the same size is selected from the measurement data and windowed (shown as the "search segment" in FIG. 11A). This segment selection starts at the location in the reference data minus half a desired search range (see the example search range shown in FIG. 11A). A spectral amplitude correlation is performed on the data from this measurement segment and the reference segment, and the amplitude vs. spectral index is recorded. Another measurement segment is selected by advancing the search segment within the search range by a spatial index, (e.g., moving the search segment to the right in a desired search range shown in FIG. 11A), and another cross correlation spectrum is recorded. This advancing spatial index-cross correlation procedure is repeated until the desired search range is covered in the measurement data. The maximum correlation peak among the recorded correlation spectra is then determined. The spatial location of, or delay associated with, the measurement segment that yielded the greatest correlation peak is selected as the location of the desired segment in the measurement data.

Figure 12:
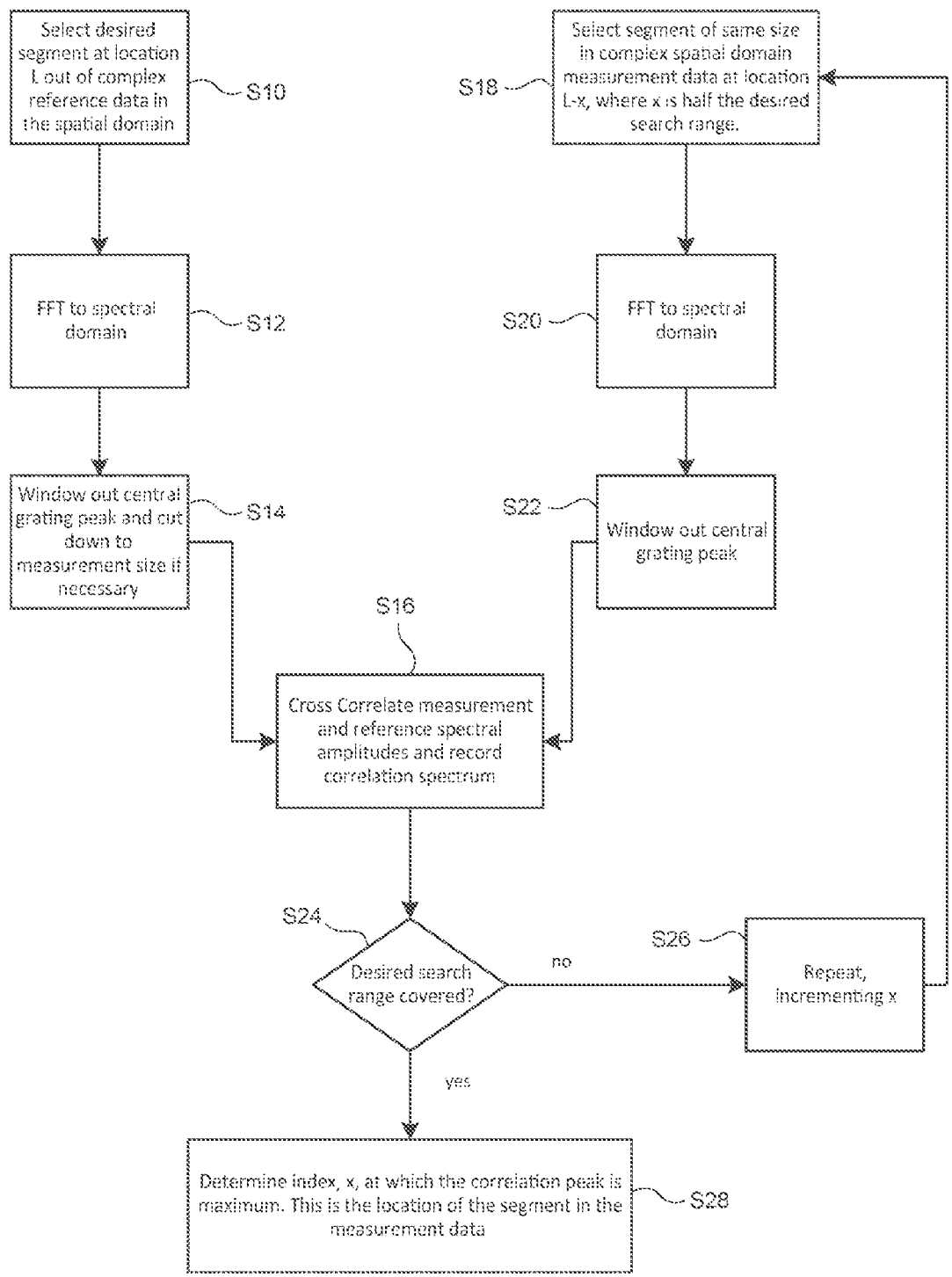
FIG. 12 outlines example procedures for determining a spatial location of, or delay associated with, a measurement segment that yields a greatest correlation peak for selection as the location of the desired segment in the measurement data.

The flow chart shown in FIG. 12 outlines example procedures for such a process. A desired segment of complex reference data is selected at a fiber location L in the spatial domain (step S10). A Fourier transform is performed on the desired segment of complex reference data to transform it into the spectral domain (step S12). The center grating peak is windowed out (and the size of the reference data is reduced to measurement data size) (step S14). The measurement and reference spectral amplitudes are cross correlated, and the result is stored in memory (step S16). A decision is made in step S24 to determine whether the desired search range has been covered. If it has, then the index, x, is determined at which the correlation peak is maximum (step S28). This is the location of the segment in the measurement data. If the desired range has not been covered, then the process repeats after incrementing the index x (step S26). Steps S18-S22 are similar to steps S10-S14 performed for the segment of measurement data at location L-x, where x is initially half the desired search range.

Although the searching example above used one segment of reference data to correlate with multiple segments in a search range of segments of measurement data, a similar result may be obtained by correlating one segment of measurement data with multiple segments in a search range of segments of reference data.

In example embodiments, the location of the measurement segment is identified with fractional index accuracy. The temporal domain data is interpolated to a higher resolution spatially in the following non-limiting example implementation using a Fourier transform technique in which the data is transformed to the spectral domain, zero-padded by a desired interpolation factor, and inverse-transformed back to the temporal domain. The steps in selecting the measurement segment may then be fractional steps. For example, if the data is interpolated by a factor of two, each step can be a half an index. Interpolation by a factor of four makes it possible to step by quarter indices and so forth.

Figure 13:
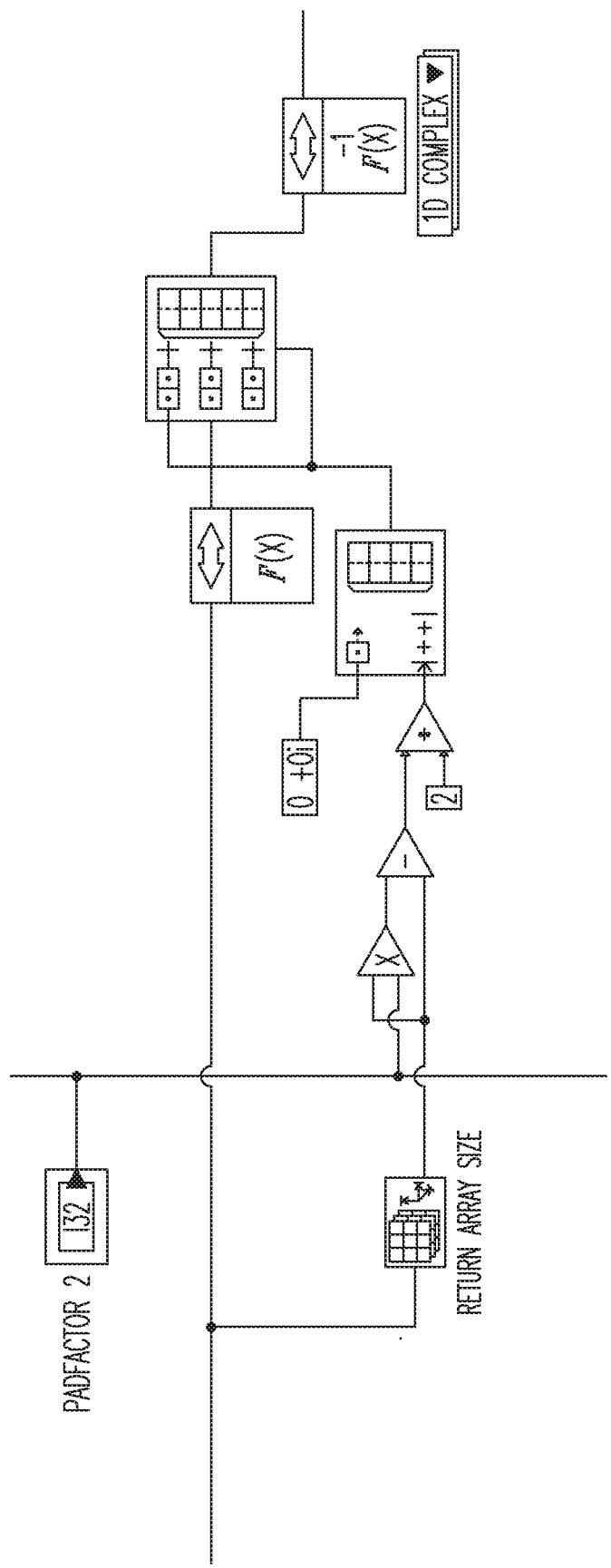
FIG. 13 shows, using LabView code, an example of how to zero pad the data.

FIG. 13 shows, using LabView code, a non-limiting example of how to zero pad the data. LabView stands for Laboratory Virtual Instrument Engineering Workbench and is a well-known system design platform and development environment for a visual programming language. Execution of LabView code is determined by the structure of a graphical block diagram (which is the LabView-source code) on which a programmer connects different function-nodes by drawing wires. These wires propagate variables and any node can execute as soon as all its input data become available. The input on the left side of FIG. 13 is the complex data in the spatial domain, and the output on the right side of FIG. 13 is the zero padded, interpolated data in the spatial domain. The input data is first transformed to the spectral domain via Fourier transform. An array of zeros is symmetrically added to the data such that the size of the new array is the original size multiplied by the desired interpolation factor, i.e. 2, 4, etc. This zero-padded array is then inverse transformed back to the temporal domain using an inverse Fourier transform. This temporal domain data is now interpolated by the desired interpolation factor, and the spatial resolution has been increased by that interpolation factor. This zero padding is performed before selecting the measurement segment to enable fractional index stepping.

Figure 14:
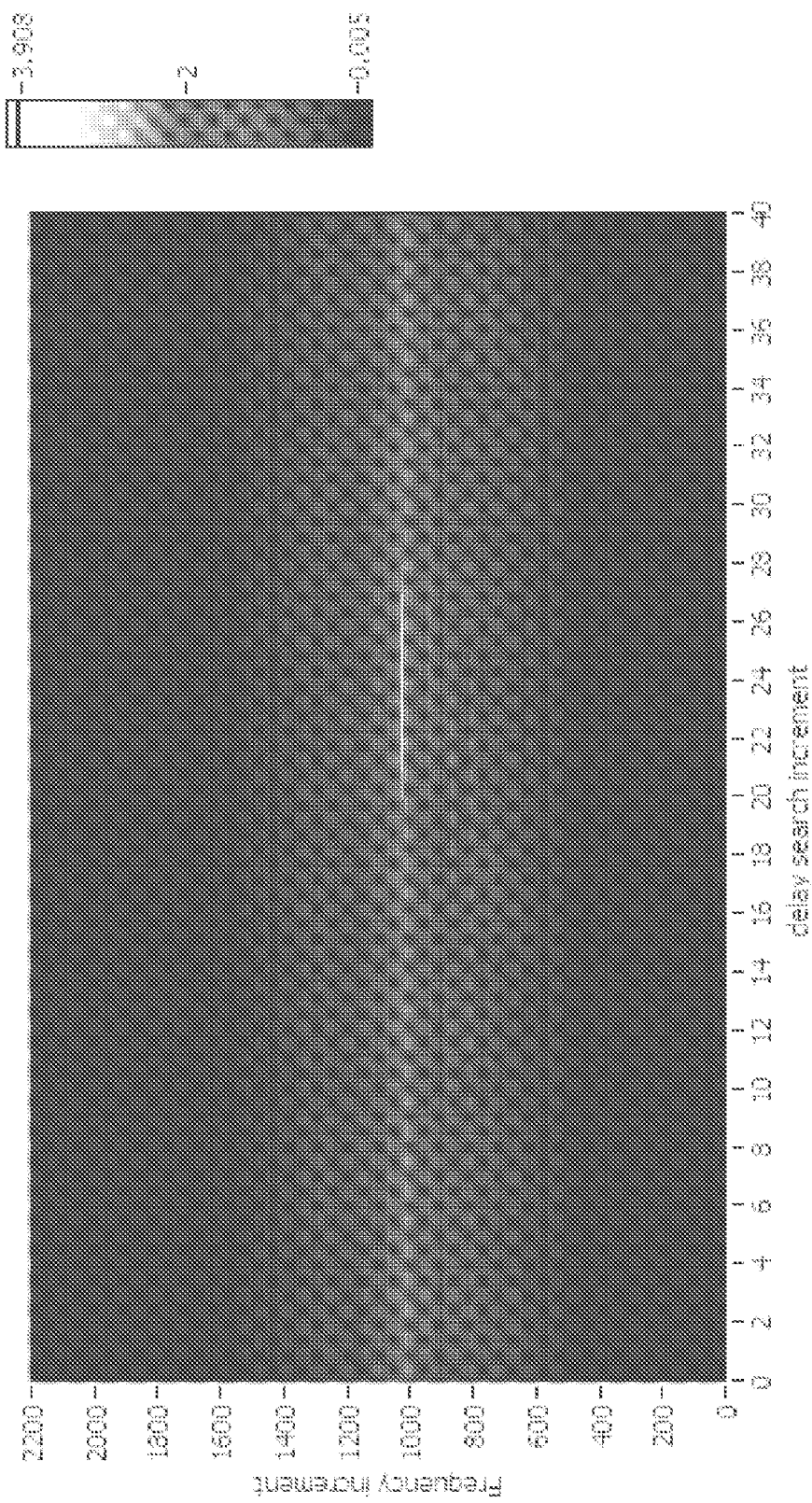
FIG. 14 is an example graph showing cross correlation amplitude vs. frequency increment (vertical axis) and delay increment (horizontal axis).
Figure 15:
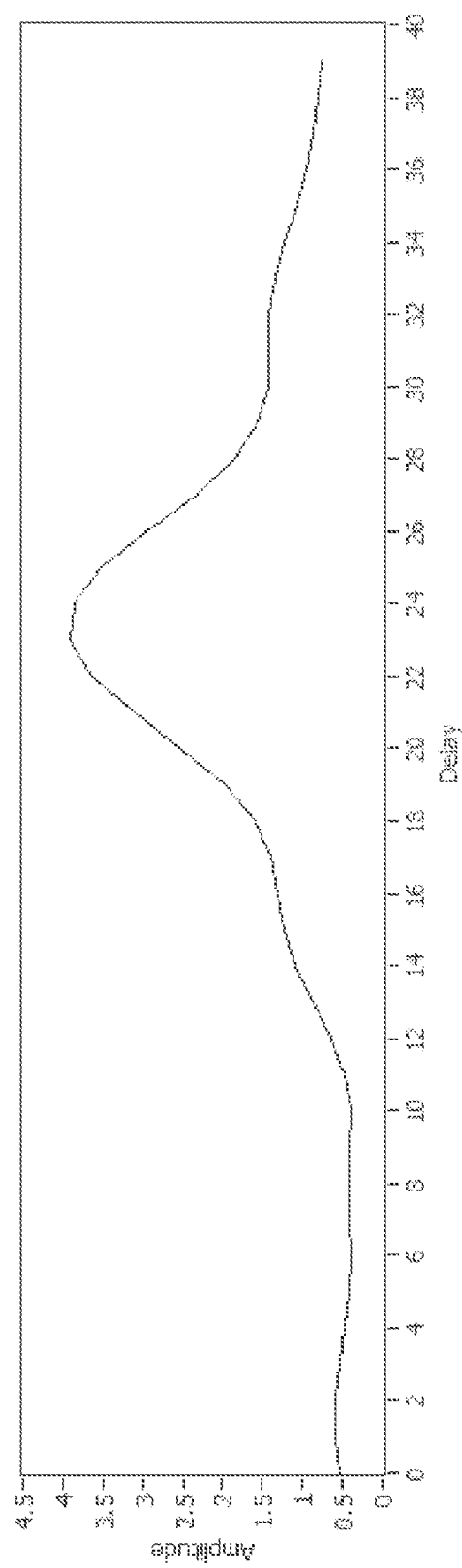
FIG. 15 shows a plot of an example correlation amplitude vs. delay slice.

A two dimensional array can be formed of correlation data vs. spectral index vs. delay location. FIG. 14 is an example gray scale graph showing cross correlation amplitude vs. frequency (spectral) increment (vertical axis) and delay increment (horizontal axis). This two dimensional image plot is the result of a cross-correlation search operation described above. A horizontal slice (gray scale) is taken at the frequency (frequency increment just above 1000) at which the maximum cross correlation amplitude occurs (lightest region in the slice) can be used to find the fractional delay index value (i.e., 23) at which this maximum occurs. An example correlation peak vs. delay slice is shown in FIG. 15 which confirms that maximum amplitude at delay increment 23.

Figure 16:
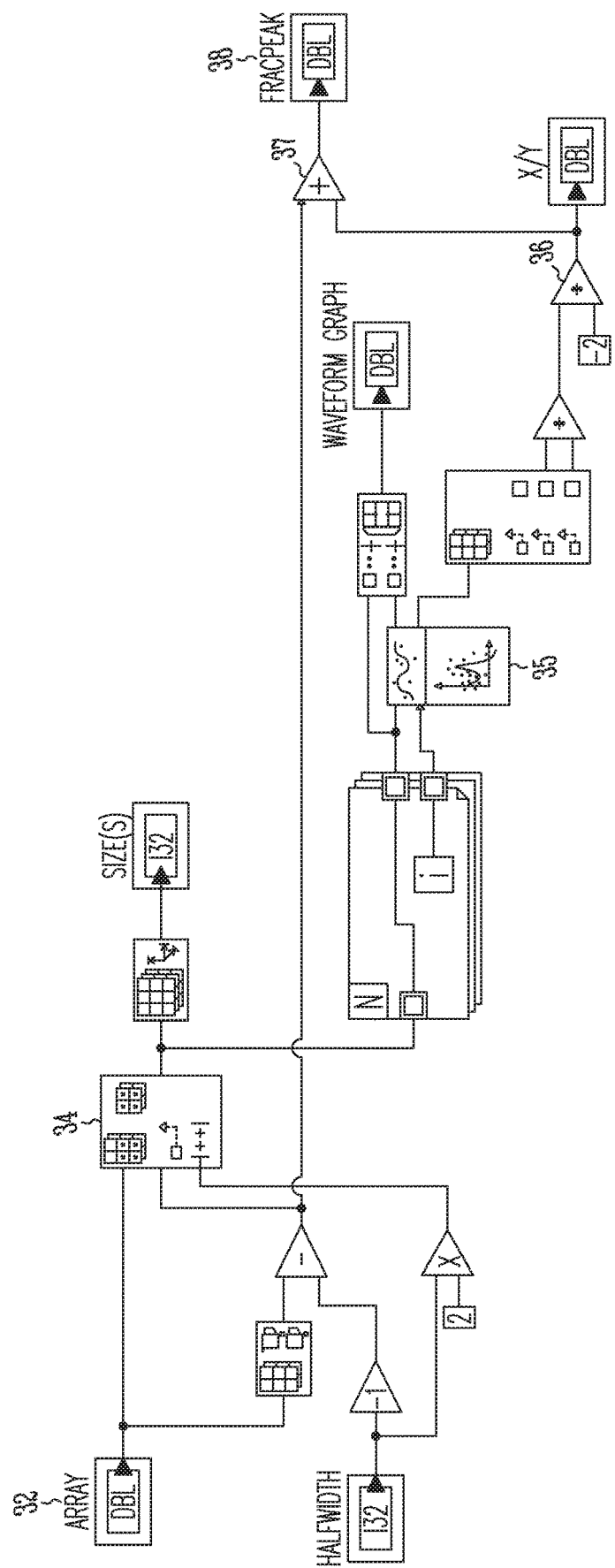
FIG. 16 shows in LabView code how to use a parabolic fit of the data around the peak to find the fractional location of the maximum correlation.

In example embodiments, a parabolic fit of the data around the peak can then be used to find the fractional location of the maximum. The non-limiting example implementation LabView code shown in FIG. 16 may be used to perform this operation. In this sample code, a subset of the data 32 is taken, e.g., a desired search range or width, centered at the maximum point in the data 34. This data is then "fit" with a parabolic fit 35. If a parabola is given by:

$$y=a+bx+cx^2$$

The maximum point of that parabola is when the derivative is zero:

$$0=b+2cx$$

$$x=-b/2c$$

This value added 36 to the starting point of the data subset 37, gives the fractional maximum point of the data set 38.

Figure 17:
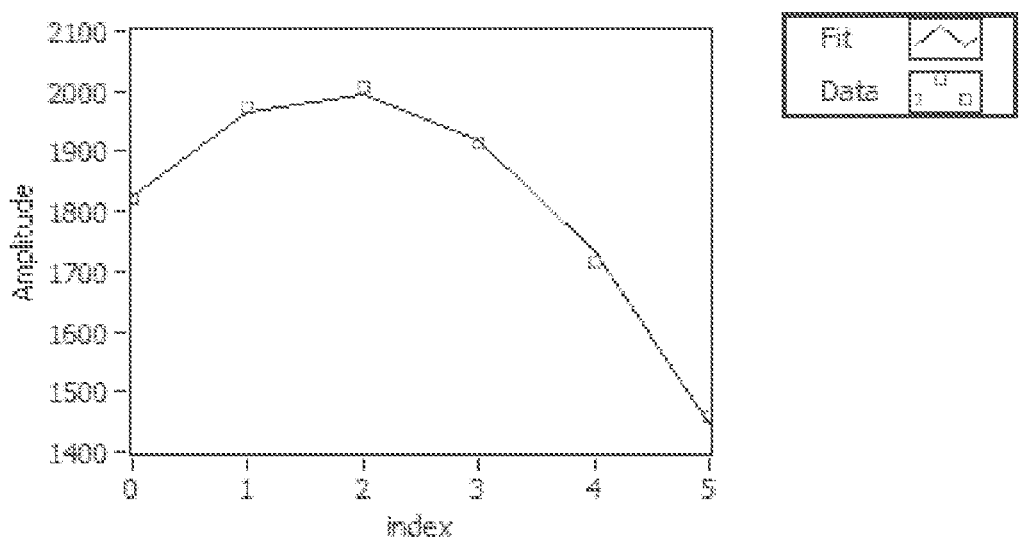
FIG. 17 is an example plot that shows a sample peak and the parabolic fit used to find the fractional peak amplitude.

The example plot in FIG. 17 shows a sample peak and the parabolic fit used to find the fractional peak amplitude of about 2000 at index 2.

A combination of Fourier interpolation (zero-padding) and using a parabolic fit is a computationally efficient way (but still an example way) of determining the fractional delay (which corresponds to the location along the fiber) at which the measurement segment matches the reference segment. Fourier interpolation is performed to a sufficient level so that the peak in the correlation amplitude vs. delay data forms a smooth function that can be fit with a parabola. The parabolic fit is then a more efficient way of achieving additional fractional accuracy as compared to performing additional interpolation.

Figure 18:
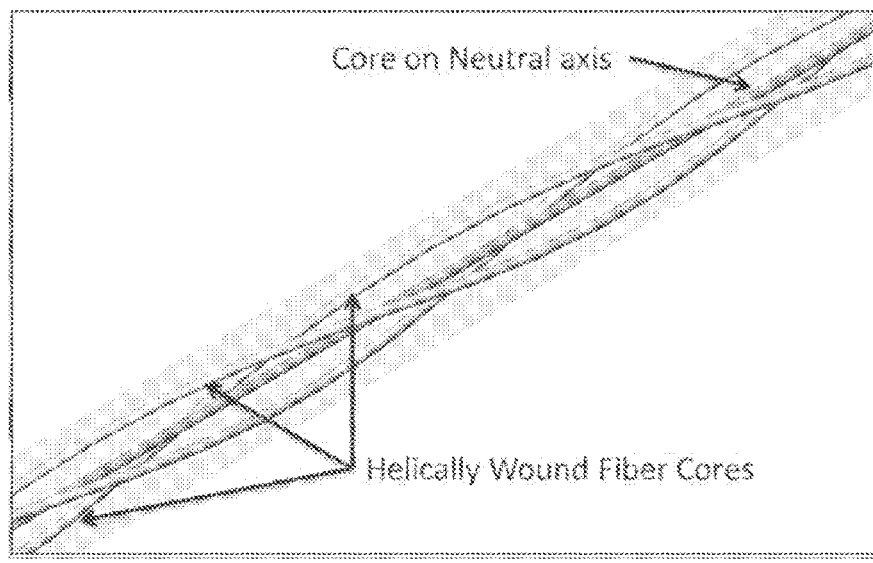
FIG. 18 shows an example multicore fiber with helixed cores.

Additional embodiments address situations in which the fiber is bent, which can be of particular interest for multicore fiber with helixed cores as often used for shape sensing. An example multicore fiber with helixed cores is shown in FIG. 18. An additional step is used in the data processing for multicore fiber with helixed cores. When the fiber is bent, the gratings in the outer cores experience alternating tension and compression at the helix period of the fiber. This tension and compression causes the reflected spectra from the gratings to shift.

Figure 19:
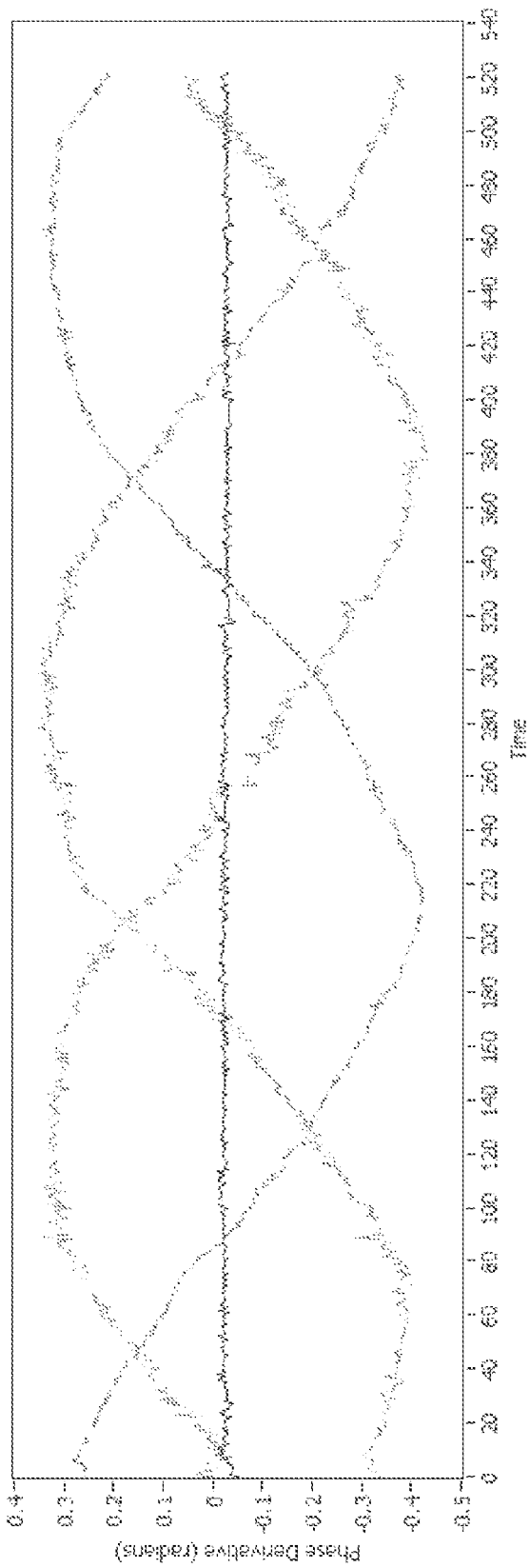
FIG. 19 is an example plot of the phase derivative v. time of four helixed cores over a segment where the fiber is bent.

An example plot of the phase derivative v. time of four helixed cores over a segment where the fiber is bent is shown in FIG. 19. This phase derivative is proportional to the reflected wavelength as a function of distance down the fiber. As can be seen from the plot in FIG. 19, the bend in the fiber causes the wavelength to oscillate in the three outer cores, no longer being relatively fixed at a center wavelength as is the case of the center core having a phase derivative close to zero. The result of this effect is that the grating spectra for the outer cores of a bent segment are spread and not tightly-centered around a central peak. In order to more effectively window out the reflected spectrum from the grating while leaving behind a sufficient amount of the broadband signal, the spectrum is compressed back to a central peak. This is performed in an example implementation by calculating a phase estimate that estimates the effect on the phase due to the bend.

Figure 20:
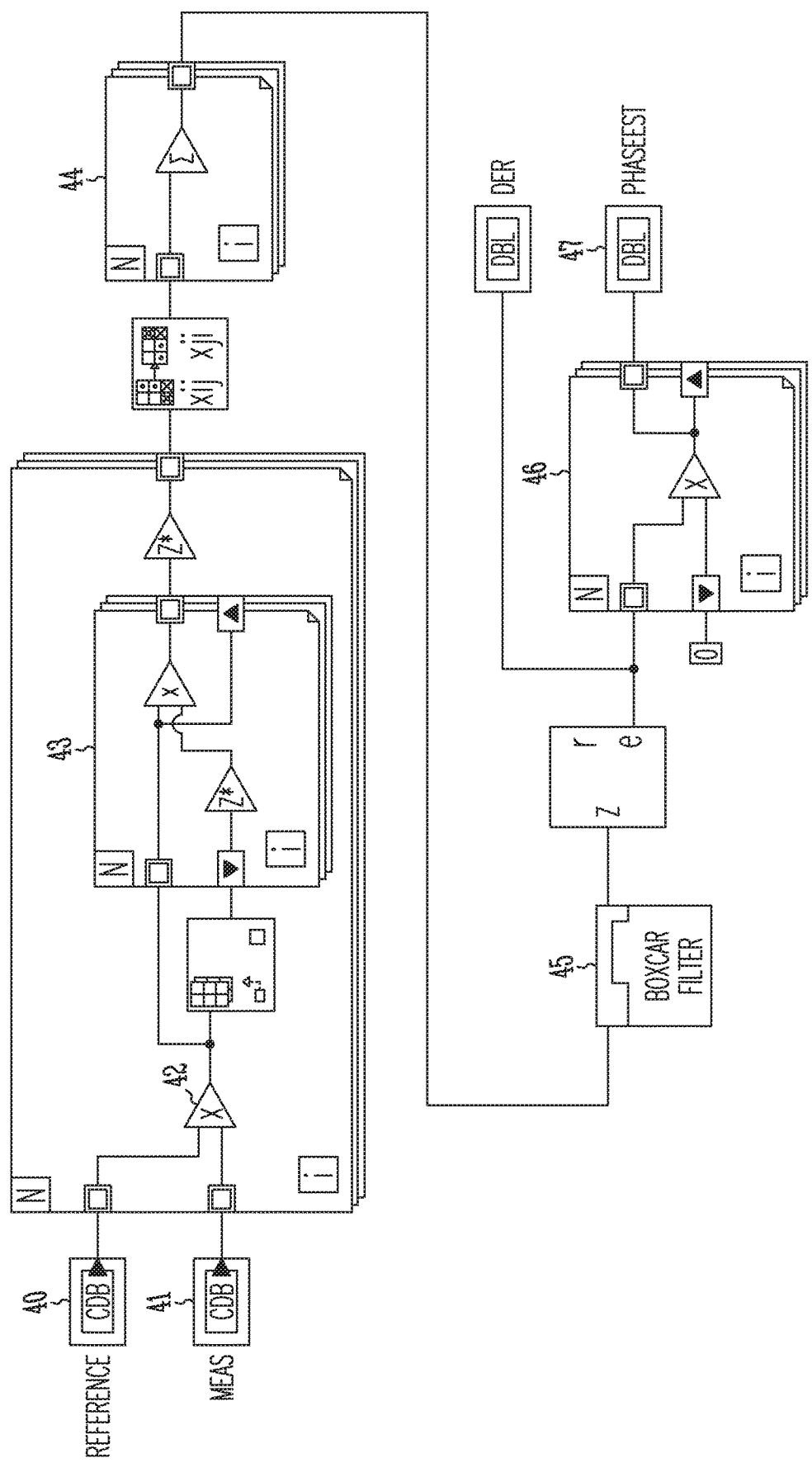
FIG. 20 shows example LabView code that calculates a phase effect due to a bend in the fiber.

A non-limiting example implementation that calculates such an estimate is shown using LabView code in FIG. 20. The reference data is reduced down to the size of the measurement data, but left un-windowed, thereby leaving the grating signal in the data. The complex conjugated reference data 40 is multiplied by the measurement data 41 for all polarization signals 42. In an example OFDR system used for shape sensing, data is recorded for two orthogonal input polarization states measured at two polarization diverse detectors, labeled S and P resulting in a total of four polarization signals. This method works for any subset of this data, i.e., four polarization states are not required. A phase derivative is effectively calculated by multiplying each data point within a temporal domain complex data set by the complex-conjugate of the previous data point 43. The resulting signals from each of the four polarization states are summed 44, and the result is filtered 45 and then integrated 46 to form an estimate of the phase difference between the measurement and reference signals.

Figure 21:
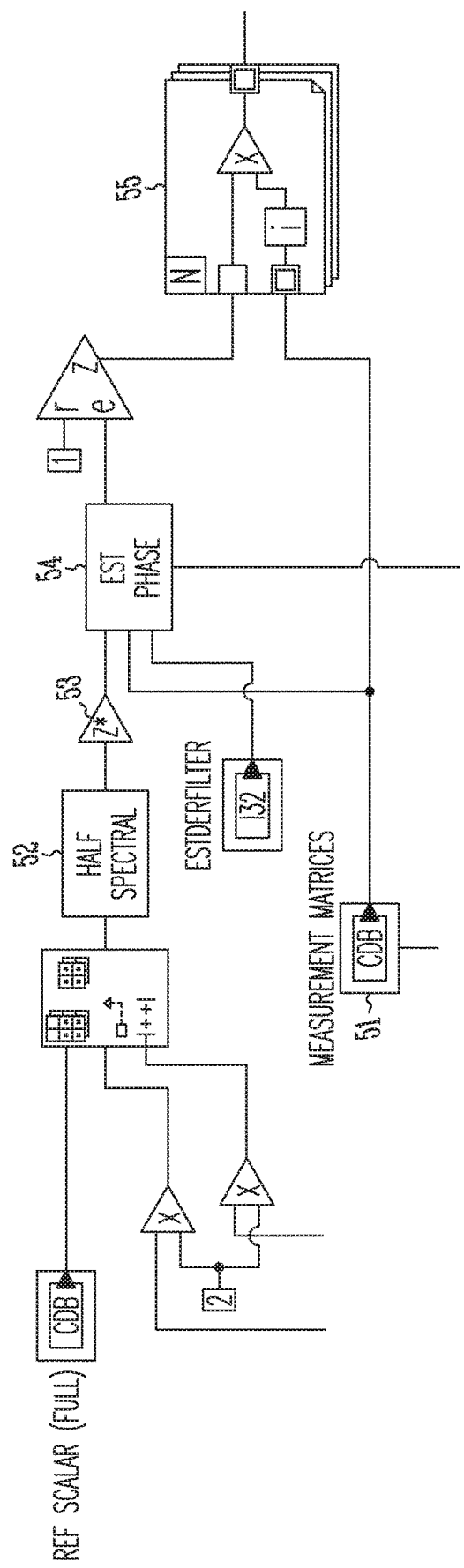
FIG. 21 shows example LabView code that corrects the measurement data using a phase estimate correction.

The measurement data is corrected with this phase difference by multiplying the measurement data by a vector having a phase equal to the estimated phase difference, which compresses the spectral data around a central peak. This measurement data correction operation can be performed in one non-limiting implementation with the non-limiting example LabView code shown in FIG. 21. The reference data 0 is preferably spectrally reduced in size 52 to match the size of the measurement data set 51. In one example, the reference is twice the size of the measurement and centered around the same wavelength. More generally, the reference data may be any data set containing the measurement data's spectral range. An appropriate subset of the reference data that matches the measurement data's spectral size and wavelength range may be used from the potentially larger reference data set. The complex conjugate of the reference data 53 is then used to calculate an estimate of the phase difference between the measurement and reference data sets 54. This phase difference estimate is used to correct the measurement data set by multiplying the measurement data by a vector of unity amplitude and a phase corresponding to the phase difference estimate 55. The effect of this operation is to remove the calculated phase difference from the measurement data to compress the spectrum reflected from the gratings in the measurement data.

Figure 22B:
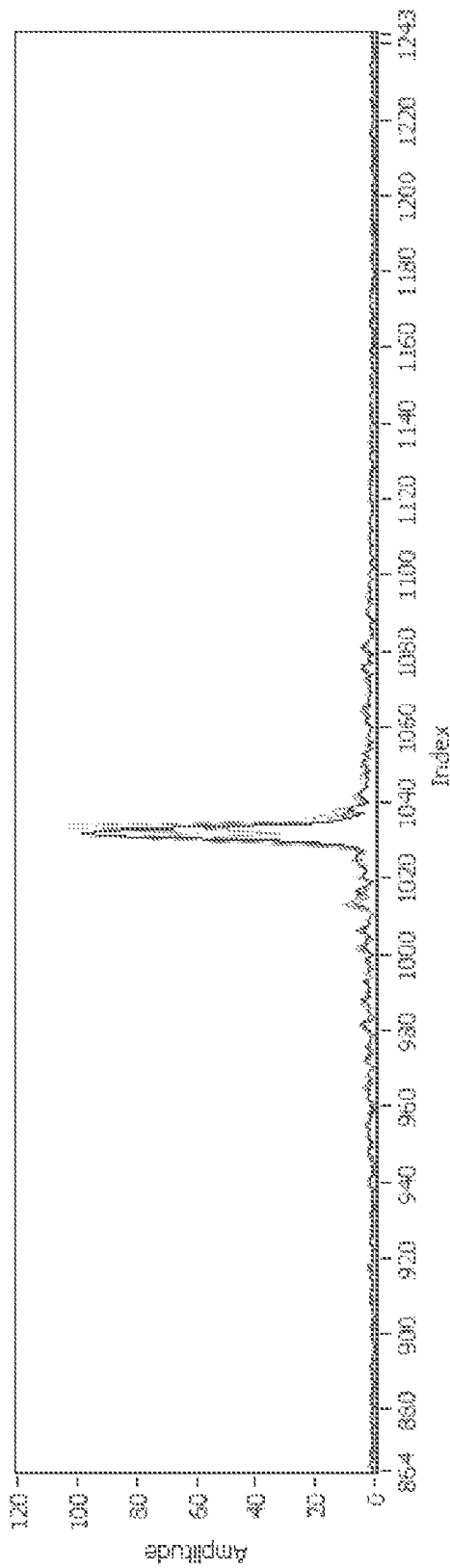
FIG. 22B is a plot showing the same measurement data in FIG. 22A but after a phase estimate correction has been applied.

The plot in FIG. 22A shows example measurement spectra for four polarization states (lighter shaded lines) compared with the reference data spectrum (black lines) when the measurement data has not been corrected with a phase estimate. The plot in FIG. 22B shows this same measurement data after a phase estimate correction has been applied. The phase correction compresses the measurement data reflected spectra for the gratings back to a peak resembling the reference (unbent fiber) spectrum. This corrected measurement data is then windowed, and the cross-correlation search is performed to identify the correct delay (location on the fiber) to register the measurement data with the reference data.

Figure 23:
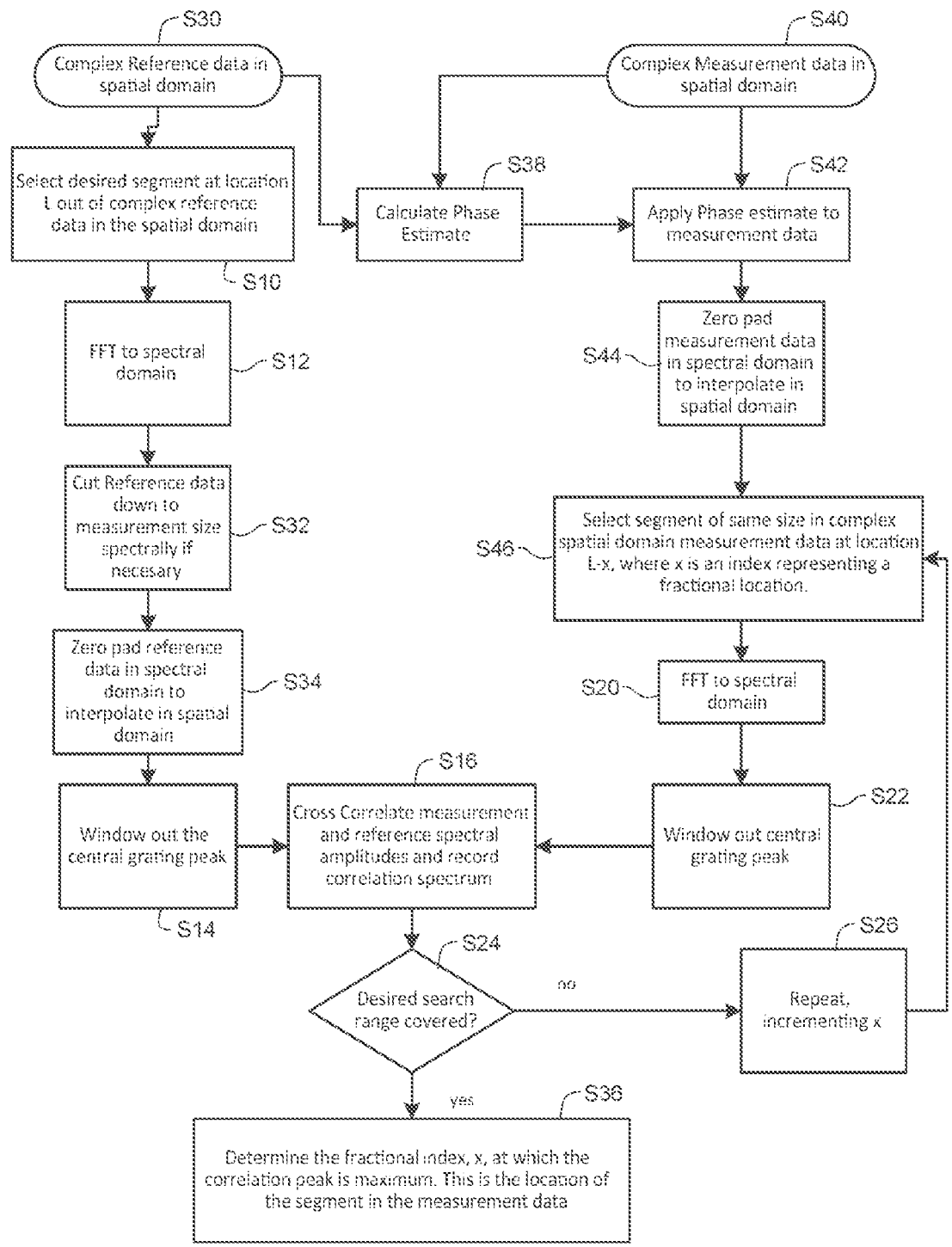
FIG. 23 is a flow chart showing registration procedures similar to those in FIG. 12 with the addition of zero padding and finding a fractional peak.

FIG. 23 is a flow chart showing registration procedures similar to those in FIG. 12 with the addition of zero padding and finding a fractional peak. FIG. 23 includes starting steps S30 and S40 that respectively provide complex reference data and complex measurement data in the spatial domain. A desired segment location L is selected from the complex reference data in step S10, and the complex reference data and measurement data are processed as described above to calculate a phase estimate (step S38). The phase estimate is applied to the measurement data (step S42), which is then zero padded in the spectral domain to provide for interpolation (step S44). A desired segment of the same size is selected from the spatial domain measurement data at location L-x, where x is an index representing a fractional location (step S46). Steps S20 and S22 are performed as in FIG. 12. From step S10, the selected segment a location L of the reference data is FFTed to the spectral domain in step S12 and the reference reduced in size if necessary (step S32). Zero pad reference data is added in the spectral domain for interpolation (step S34), and steps S14, S16, S24, and S26 are performed as in FIG. 12. When the desired search range is covered, the fractional index x at which the correlation peak is a maximum is determined which identifies the proper registration location for that measurement data segment with respect to the corresponding reference data.

Figure 24A:
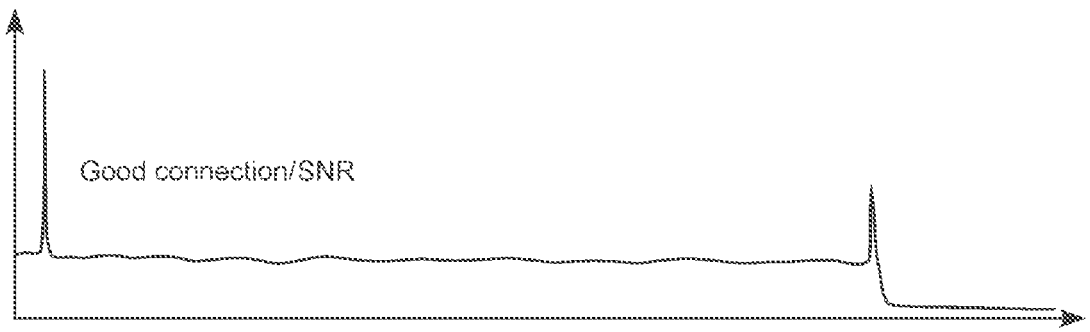
FIGS. 24A-24C show example plots of reflected amplitude vs. distance or delay.
Figure 24B:
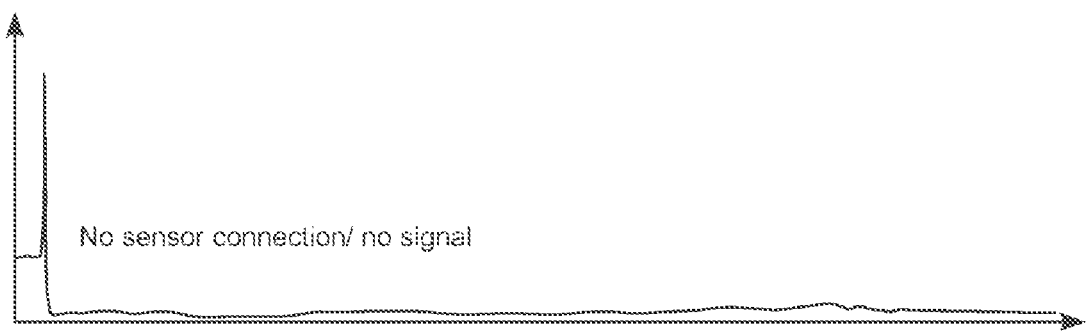
Figure 24C:
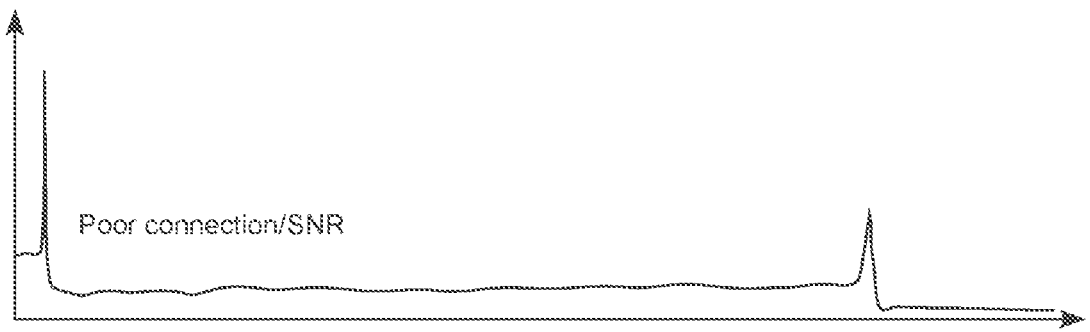

The technology therefore uniquely identifies or locates a segment of fiber with respect to its corresponding location in a reference measurement. Because the random signals present in a fiber are unique to that fiber, this registration technology may be used to identify which or if any sensor is connected at any given time to the OFDR In one example application, a reference data file is selected. If the measurement data file matches this reference data file, then the correct fiber sensor is connected. If a satisfactory correlation is not obtained, then either the wrong fiber sensor is connected or no fiber sensor is connected. The signal level after the multi-core connector 12 (the large peak on the left side of the plots in FIGS. 24A and 24B) is used to distinguish between these two situations. Poor connection quality may also lead to a lack of correlation. This condition may also be determined by evaluating the reflected signal level detected in the fiber sensor relative to a noise floor. In FIG. 24C, the reflected signal amplitude level labeled "Poor connection/SNR" is not much more than the noise floor level shown on the right side of the plot.

Another example application stores the reference files for all available sensors. The data processor compares the measurement data to each reference file in storage until it finds a satisfactory correlation match. The reference file that satisfactorily matches the measurement data identifies which sensor is connected.

In other example embodiments, higher quality, more repeatable results may be achieved using data averaging. Data for each of multiple OFDR scans of the sensing fiber in the same state are recorded as a function of time, and those complex data sets are averaged, which improves the signal to noise ratio (SNR), and thus, the correlation quality. Averaging both the reference data and the measurement data result in higher quality data and better correlation results. In normal operation it is typical to store averaged reference data. However, it is less practical to work with averaged measurement data. Instead, the correlation data can be averaged over several scans. In this case, the correlation between each measurement scan and the averaged reference data is calculated and the resulting data is averaged. This averaged correlation data can then be used to find a better fractional peak. One can average the entire correlation amplitude vs. frequency vs. delay array, as shown in FIG. 6, or simply average the slice of correlation amplitude vs. delay at the maximum frequency, i.e. FIG. 7.

Other example embodiments normalize the input data so that the correlation amplitude does not vary widely with the measurement data or reference data amplitude or the segment size used for the correlations. Normalization is achieved by dividing the correlation amplitude by the mean amplitude of the reference data and the measurement data and by multiplying by the interpolation factor and the square of the segment size. This allows a correlation amplitude threshold to be set, above which the correlation is recognized as satisfactory, indicating the correct sensor is connected, is uniquely identified, and spatially registered. Below that threshold, the correlation is considered unsatisfactory, indicating poor signal quality or that an incorrect sensor is connected.

When the measurement data and reference data are sufficiently spectrally aligned, the registration process can be simplified. This is the case if the measurement data is not significantly spectrally shifted from the reference data due to applied temperature or strain or a wavelength shift in the scan range. This is also the case if a good phase estimate correction is applied to the measurement data to bring the measurement and reference data into satisfactory spectral alignment. If the measurement data and reference data are sufficiently spectrally aligned, rather than performing the spectral amplitude cross-correlation at various delay increments, as described above, a simpler temporal amplitude cross-correlation may be performed. Instead of providing a two dimensional correlation amplitude vs. frequency vs. delay plot, this simplified process directly provides a plot of correlation vs. delay. The same interpolation and parabolic fitting steps apply to yield a fractional delay at which the correlation is maximum. If the data sets are not spectrally aligned leading to an unsatisfactory correlation, then the more comprehensive search described is preferred.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC § 112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A data processing system for registering an optical fiber having a core, the core including multiple optical gratings closely-spaced and written along the core such that there is a repeated pattern along the core, the data processing system comprising:
   a memory configured to store predetermined reference reflection data and measurement reflection data determined for a length of the core and detected from interferometric patterns corresponding to scatter reflections received from the core; and
   data processing circuitry coupled to the memory, the data processing circuitry configured to:
      filter or window a central spectral peak of the optical gratings out of the reference reflection data to produce filtered reference reflection data;
      filter or window a central spectral peak of the optical gratings out of the measurement reflection data to produce filtered measurement reflection data;
      produce multiple correlation values by correlating: multiple segments within a search range of segments of the filtered measurement reflection data with a selected segment of the filtered reference reflection data corresponding to a desired fiber segment, or a selected segment of the filtered measurement reflection data with multiple segments within a search range of segments of the filtered reference reflection data;
      determine a greatest correlation value of the multiple correlation values; and
      identify a location along the core of a segment of the filtered measurement reflection data corresponding to the greatest correlation value based on a location along the core of a segment of the filtered reference reflection data corresponding to the greatest correlation value.

2. The data processing system of claim 1, wherein the filtered measurement reflection data includes at least one of:
   Rayleigh scatter data detected for core segments between adjacent optical gratings of the multiple optical gratings; and
   reflection data detected for core segments corresponding to overlapping optical gratings of the multiple optical gratings.

3. The data processing system of claim 1, wherein the optical fiber includes multiple helixed cores, each core of the multiple helixed cores including multiple optical gratings closely-spaced and written along the core, and wherein the data processing circuitry is further configured to compress reflected grating spectra corresponding to outer cores of the multiple helixed cores to undo spreading of the reflected grating spectra caused by fiber bend.

4. The data processing system of claim 1, wherein the data processing circuitry is further configured to reduce a size of the reference reflection data to a size of the measurement reflection data.

5. The data processing system of claim 1, wherein the data processing circuitry is further configured to incrementally change the segments within the search range of segments of the filtered measurement reflection data by an index increment, the index increment having a first resolution within the search range, and wherein the data processing circuitry is configured to interpolate between adjacent indices to achieve finer resolution.

6. The data processing system of claim 1, wherein the data processing circuitry is configured to correlate the multiple segments within the search range of segments of the filtered measurement reflection data with the selected segment of the reference reflection data, or to correlate the selected segment of the filtered measurement reflection data with the multiple segments within the search range of segments of the filtered reference reflection data by:
   determining a parabolic fit of multiple correlation values; and
   determining the location along the core corresponding to the greatest correlation value using the parabolic fit.

7. The data processing system of claim 1, wherein the data processing circuitry is configured to average multiple sets of data to determine the measurement reflection data.

8. The data processing system of claim 1, wherein, if none of the correlation values exceeds a threshold, the data processing circuitry is configured to determine that the optical fiber does not match the reference reflection data.

9. The data processing system of claim 1, wherein the data processing circuitry is further configured to:
   identify the optical fiber from multiple different optical fibers based on the multiple correlation values, or identify whether an optical fiber is connected to an interferometric measurement system based on the multiple correlation values, or detect an undesirable connection of an optical fiber to an interferometric measurement system based on a comparison of a reflected signal level detected for the optical fiber to a noise floor.

10. A method for registering an optical fiber having a core including multiple optical gratings closely-spaced and written along the core such that there is a repeated pattern in the core, the method comprising:

detecting interferometric patterns corresponding to scatter reflections received from the core;

determining measurement reflection data for a length of the core from the interferometric patterns;

filtering or windowing a central spectral peak of the optical gratings out of reference reflection data to produce filtered reference reflection data;

filtering or windowing a central spectral peak of the optical gratings out of the measurement reflection data to produce filtered measurement reflection data;

producing multiple correlation values by correlating: multiple segments within a search range of segments of the filtered measurement reflection data with a selected segment of the filtered reference reflection data corresponding to a desired fiber segment, or a selected segment of the filtered measurement reflection data with multiple segments within a search range of segments of the filtered reference reflection data;

determining a greatest correlation value of the multiple correlation values; and identifying a location along the core of a segment of the filtered measurement reflection data corresponding to the greatest correlation value based on a location along the core of a segment of the filtered reference reflection data corresponding to the greatest correlation value.

11. The method of claim 10, wherein the filtered measurement reflection data includes at least one of:

Rayleigh scatter data detected for core segments between adjacent optical gratings of the multiple optical gratings; and reflection data detected for core segments corresponding to overlapping optical gratings of the multiple optical gratings.

12. The method of claim 11, wherein the optical fiber includes multiple helixed cores, each core of the multiple helixed cores including multiple optical gratings closely-spaced and written along the core, and wherein the method further comprises compressing reflected grating spectra corresponding to outer cores of the multiple helixed cores to undo spreading of the reflected grating spectra caused by fiber bend.

13. The method of claim 11, further comprising reducing a size of the reference reflection data to a size of the measurement reflection data.

14. The method of claim 11, further comprising incrementally changing the segments within the search range of segments of the filtered measurement reflection data by an index increment, the index increment having a first resolution within the search range, and interpolating between adjacent indices to achieve finer resolution.

15. The method of claim 11, wherein correlating the multiple segments within the search range of segments of the filtered measurement reflection data with the selected segment of the reference reflection data, or correlating the selected segment of the filtered measurement reflection data with the multiple segments within the search range of segments of the filtered reference reflection data, comprises:

determining a parabolic fit of multiple correlation values; and determining the location along the core corresponding to the greatest correlation value using the parabolic fit.

16. The method of claim 11, further comprising averaging multiple sets of data to determine the measurement reflection data.

17. The method of claim 11, further comprising, in response to none of the correlation values exceeding a threshold, determining that the optical fiber does not match the reference reflection data.

18. The method of claim 11, further comprising at least one of:

identifying the optical fiber from multiple different optical fibers based on the multiple correlation values, identifying whether an optical fiber is connected to an interferometric measurement system based on the multiple correlation values, or detecting an undesirable connection of an optical fiber to an interferometric measurement system based on a comparison of a reflected signal level detected for the optical fiber to a noise floor.

19. A non-transitory computer-readable storage medium storing instructions that, when executed by a computer, cause the computer to perform operations for registering an optical fiber by processing reference reflection data and measurement reflection data determined for a length of a core of the fiber and detected from interferometric patterns corresponding to scatter reflections received from the core, the core including multiple optical gratings closely-spaced and written along the core such that there is a repeated pattern along the core, the operations comprising:

filtering or windowing a central spectral peak of the optical gratings out of the reference reflection data to produce filtered reference reflection data;

filtering or windowing a central spectral peak of the optical gratings out of the measurement reflection data to produce filtered measurement reflection data;

producing multiple correlation values by correlating: multiple segments within a search range of segments of the filtered measurement reflection data with a selected segment of the filtered reference reflection data corresponding to a desired fiber segment, or a selected segment of the filtered measurement reflection data with multiple segments within a search range of segments of the filtered reference reflection data;

determining a greatest correlation value of the multiple correlation values; and identifying a location along the core of a segment of the filtered measurement reflection data corresponding to the greatest correlation value based on a location along the core of a segment of the filtered reference reflection data corresponding to the greatest correlation value.

20. The computer-readable medium of claim 19, the operations further comprising at least one of:

determining that the optical fiber does not match the reference reflection data if none of the correlation values exceeds a threshold, identifying the optical fiber from multiple different optical fibers based on the multiple correlation values, or identifying whether an optical fiber is connected to an interferometric measurement system based on the multiple correlation values, or detecting an undesirable connection of an optical fiber to an interferometric measurement system based on a comparison of a reflected signal level detected for the optical fiber to a noise floor.

\* \* \* \* \*